United States Patent
Levanon et al.

(10) Patent No.: US 9,641,644 B2
(45) Date of Patent: *May 2, 2017

(54) OPTIMIZED IMAGE DELIVERY OVER LIMITED BANDWIDTH COMMUNICATION CHANNELS

(71) Applicant: BRADIUM TECHNOLOGIES LLC, Suffern, NY (US)

(72) Inventors: Isaac Levanon, Raanana (IL); Yonatan Lavi, Raanana (IL)

(73) Assignee: BRADIUM TECHNOLOGIES LLC, Suffern, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,526

(22) Filed: Dec. 15, 2015

(65) Prior Publication Data
US 2016/0112486 A1    Apr. 21, 2016

Related U.S. Application Data

(63) Continuation of application No. 14/547,148, filed on Nov. 19, 2014, now Pat. No. 9,253,239, which is a
(Continued)

(51) Int. Cl.
*G06F 15/16* (2006.01)
*H04L 29/08* (2006.01)
(Continued)

(52) U.S. Cl.
CPC .............. *H04L 67/327* (2013.01); *G06F 3/14* (2013.01); *G06F 3/1454* (2013.01);
(Continued)

(58) Field of Classification Search
CPC ...... G06T 3/4092; G09G 2340/02; G06F 3/14
(Continued)

(56) References Cited

U.S. PATENT DOCUMENTS

| 4,222,076 A | 9/1980 | Knowlton |
| 4,672,444 A | 6/1987 | Bergen et al. |

(Continued)

FOREIGN PATENT DOCUMENTS

| CA | 2215270 | 9/1997 |
| CA | 2420390 | 8/2001 |

(Continued)

OTHER PUBLICATIONS

George H. Forman and John Zahorjan, "The challenges of mobile computing," Computer vol. 27, No. 4, pp. 38, 47 (Apr. 1994), all pages.

(Continued)

*Primary Examiner* — David Lazaro
(74) *Attorney, Agent, or Firm* — Anatoly S. Weiser, Esq.; Techlaw LLP.

(57) ABSTRACT

Large-scale images are retrieved over network communications channels for display on a client device by selecting an update image parcel relative to an operator controlled image viewpoint to display via the client device. A request is prepared for the update image parcel and associated with a request queue for subsequent issuance over a communications channel. The update image parcel is received from the communications channel and displayed as a discrete portion of the predetermined image. The update image parcel optimally has a fixed pixel array size, is received in a single and or plurality of network data packets, and were the fixed pixel array may be constrained to a resolution less than or equal to the resolution of the client device display.

65 Claims, 5 Drawing Sheets

Related U.S. Application Data continuation of application No. 13/027,929, filed on Feb. 15, 2011, now Pat. No. 8,924,506, which is a continuation-in-part of application No. 12/619,643, filed on Nov. 16, 2009, now Pat. No. 7,908,343, which is a continuation of application No. 10/035,987, filed on Dec. 24, 2001, now Pat. No. 7,644,131.

(60) Provisional application No. 60/258,465, filed on Dec. 27, 2000, provisional application No. 60/258,466, filed on Dec. 27, 2000, provisional application No. 60/258,467, filed on Dec. 27, 2000, provisional application No. 60/258,468, filed on Dec. 27, 2000, provisional application No. 60/258,488, filed on Dec. 27, 2000, provisional application No. 60/258,489, filed on Dec. 27, 2000.

(51) Int. Cl.
*G06F 3/14* (2006.01)
*G06T 3/40* (2006.01)
*H04L 29/06* (2006.01)
*G09G 5/00* (2006.01)

(52) U.S. Cl.
CPC .......... *G06T 3/4092* (2013.01); *G09G 5/003* (2013.01); *H04L 65/602* (2013.01); *H04L 67/42* (2013.01); *G09G 2340/02* (2013.01); *G09G 2350/00* (2013.01); *G09G 2370/02* (2013.01); *G09G 2370/16* (2013.01)

(58) Field of Classification Search
USPC .............. 709/202, 203, 217, 230, 246, 247; 345/625; 382/232, 305
See application file for complete search history.

(56) References Cited

U.S. PATENT DOCUMENTS

| | | | |
|---|---|---|---|
| 4,698,689 A | 10/1987 | Tzou | |
| 4,972,319 A | 11/1990 | Delorme | |
| 5,179,638 A | 1/1993 | Dawson et al. | |
| 5,263,136 A | 11/1993 | DeAguiar et al. | |
| 5,321,520 A | 6/1994 | Inga et al. | |
| 5,384,643 A | 1/1995 | Inga et al. | |
| 5,604,824 A | 2/1997 | Chui et al. | |
| 5,630,757 A | 5/1997 | Gagin et al. | |
| 5,651,676 A | 7/1997 | Artwick | |
| 5,682,441 A | 10/1997 | Ligtenberg et al. | |
| 5,692,193 A | 11/1997 | Jagannathan et al. | |
| 5,724,070 A | 3/1998 | Denninghoff et al. | |
| 5,734,893 A | 3/1998 | Li et al. | |
| 5,760,783 A | 6/1998 | Migdal et al. | |
| 5,764,235 A | 6/1998 | Hunt et al. | |
| 5,798,770 A | 8/1998 | Baldwin | |
| 5,818,469 A | 10/1998 | Lawless et al. | |
| 5,929,860 A | 7/1999 | Hoppe | |
| 5,940,117 A | 8/1999 | Hasan et al. | |
| 5,949,425 A | 9/1999 | Willis | |
| 5,968,109 A | 10/1999 | Israni et al. | |
| 5,978,381 A | 11/1999 | Perlman et al. | |
| 5,987,256 A | 11/1999 | Wu et al. | |
| 6,046,744 A | 4/2000 | Hoppe | |
| 6,061,473 A | 5/2000 | Chen et al. | |
| 6,088,044 A | 7/2000 | Kwok et al. | |
| 6,092,091 A | 7/2000 | Sumita et al. | |
| 6,108,006 A | 8/2000 | Hoppe | |
| 6,118,456 A | 9/2000 | Cooper | |
| 6,121,970 A | 9/2000 | Guedalia | |
| 6,139,197 A | 10/2000 | Banks | |
| 6,179,618 B1 | 1/2001 | Stone | |
| 6,182,114 B1 | 1/2001 | Yap et al. | |
| 6,192,393 B1 | 2/2001 | Tarantino et al. | |
| 6,212,301 B1 | 4/2001 | Warner et al. | |
| 6,314,452 B1 | 11/2001 | Dekel et al. | |
| 6,346,938 B1 | 2/2002 | Chan et al. | |
| 6,397,259 B1 | 5/2002 | Lincke et al. | |
| 6,490,627 B1 | 12/2002 | Kalra et al. | |
| 6,496,189 B1 | 12/2002 | Yaron et al. | |
| 6,525,732 B1 | 2/2003 | Gadh et al. | |
| 6,536,043 B1 | 3/2003 | Guedalia | |
| 6,553,141 B1 | 4/2003 | Huffman | |
| 6,573,900 B1 | 6/2003 | Lindholm et al. | |
| 6,594,687 B1 | 7/2003 | Yap et al. | |
| 6,608,933 B1 | 8/2003 | Dowell et al. | |
| 6,633,674 B1 | 10/2003 | Barnes et al. | |
| 6,633,688 B1 | 10/2003 | Nixon et al. | |
| 6,636,802 B1 | 10/2003 | Nakano et al. | |
| 6,650,998 B1 | 11/2003 | Rutledge et al. | |
| 6,664,960 B2 | 12/2003 | Goel et al. | |
| 6,671,424 B1 | 12/2003 | Skoll et al. | |
| 6,674,038 B1 | 1/2004 | Latta | |
| 6,675,210 B1 | 1/2004 | Takeo et al. | |
| 6,684,087 B1 | 1/2004 | Yu et al. | |
| 6,684,255 B1 | 1/2004 | Martin | |
| 6,704,024 B2 | 3/2004 | Robotham et al. | |
| 6,711,297 B1 | 3/2004 | Chang et al. | |
| 6,728,960 B1 | 4/2004 | Loomans | |
| 6,750,864 B1 | 6/2004 | Anwar | |
| 6,801,665 B1 | 10/2004 | Atsumi et al. | |
| 6,850,235 B2 * | 2/2005 | Levanon | G06F 3/14 345/423 |
| 6,882,755 B2 | 4/2005 | Silverstein et al. | |
| 6,961,754 B2 | 11/2005 | Christopoulos et al. | |
| 6,963,347 B1 | 11/2005 | Selvaggi et al. | |
| 6,982,710 B2 | 1/2006 | Salomie | |
| 7,024,045 B2 | 4/2006 | McIntyre | |
| 7,024,046 B2 | 4/2006 | Dekel et al. | |
| 7,075,553 B2 | 7/2006 | Miller et al. | |
| 7,139,794 B2 * | 11/2006 | Levanon | G06F 3/14 345/420 |
| 7,206,804 B1 | 4/2007 | Deshpande et al. | |
| 7,212,678 B2 | 5/2007 | Brown et al. | |
| 7,236,637 B2 | 6/2007 | Sirohey et al. | |
| 7,242,406 B2 | 7/2007 | Robotham et al. | |
| 7,248,262 B2 | 7/2007 | Cao | |
| 7,343,555 B2 | 3/2008 | Ko et al. | |
| 7,433,881 B1 | 10/2008 | Hill | |
| 7,490,104 B2 | 2/2009 | Li et al. | |
| 7,536,446 B2 | 5/2009 | Blumberg | |
| 7,561,156 B2 * | 7/2009 | Levanon | G06T 17/005 345/419 |
| 7,589,737 B2 | 9/2009 | Hochmuth et al. | |
| 7,644,131 B2 * | 1/2010 | Levanon | G06F 3/14 345/625 |
| 7,904,594 B2 | 3/2011 | Spicer et al. | |
| 7,908,343 B2 * | 3/2011 | Levanon | G06F 3/14 345/625 |
| 8,825,812 B2 | 9/2014 | Asher | |
| 8,924,506 B2 * | 12/2014 | Levanon | G06F 3/1454 345/625 |
| 9,253,239 B2 * | 2/2016 | Levanon | G06F 3/1454 |
| 2002/0054692 A1 | 5/2002 | Suzuki et al. | |
| 2002/0057850 A1 | 5/2002 | Sirohey et al. | |
| 2002/0097411 A1 | 7/2002 | Roche et al. | |
| 2002/0108127 A1 | 8/2002 | Lew et al. | |
| 2002/0118224 A1 * | 8/2002 | Levanon | G06F 3/14 715/748 |
| 2002/0120753 A1 * | 8/2002 | Levanon | G06F 3/14 709/228 |
| 2006/0210196 A1 | 9/2006 | Wensley et al. | |
| 2007/0182734 A1 * | 8/2007 | Levanon | G06T 17/005 345/420 |
| 2010/0064002 A1 * | 3/2010 | Levanon | G06F 3/14 709/203 |
| 2011/0175914 A1 * | 7/2011 | Levanon | G06F 3/1454 345/428 |

FOREIGN PATENT DOCUMENTS

| | | |
|---|---|---|
| CA | 2349150 | 2/2005 |
| EP | 1070290 B1 | 1/2015 |

(56) References Cited

FOREIGN PATENT DOCUMENTS

| | | |
|---|---|---|
| KR | 10-2000-7010415 | 10/2006 |
| WO | 94/24625 | 10/1994 |
| WO | 96/29818 | 9/1996 |
| WO | 97/30551 | 8/1997 |
| WO | WO98/15920 | 4/1998 |
| WO | WO99/41675 | 8/1999 |
| WO | 01/16764 | 3/2001 |
| WO | 01/98925 A1 | 12/2001 |
| WO | 02/059817 | 8/2002 |

OTHER PUBLICATIONS

K. Brown & S. Singh, A Network Architecture for Mobile Computing, INFCOM '96 15th Annual Joint Conf. IEEE Comp Soc, Networking the Generation, Proceedings IEEE v3 all pages.
Kreller, B. et al "UMTS: a middleware architecture and mobile API approach," Personal Communications, IEEE, vol. 5, No. 2, pp. 32-38 (Apr. 1998) (all pages).
Hansen, J. et al, "Real-time synthetic vision cockpit display for general aviation," AeroSense '99, International Society for Optics and Photonics, 1999., all pages.
GeoTIFF Format Specification Revision 1.0, all pages.
TIFF Revision 6.0, dated Jun. 3, 1992, all pages.
FlashPix Format Specification v1.0, dated Sep. 11, 1996, all pages.
The Virtual Reality Modeling Language ISO/IEC 14772-1:1997, all pages.
Prasad, Accelerating SIFT Feature extraction with a vector DSP (Master Thesis), all pages.
IPR Petition re U.S. Pat. No. 7,908,343, filed Jan. 11, 2016, IPR2016-00448, all pages.
Excerpt of Hanan Samet, The Design and Analysis of Spatial Data Structures, University of Maryland (1989, Reprinted with corrections in Jan. 1994), all pages.
B. Fuller and I. Richer, The MAGIC Project: From Vision to Reality, IEEE Network May/Jun. 1996, pp. 15-25 (all pages).
International Telegraph and Telephone Consultative Committee ("CCITT") Recommendation T.81, Sep. 1992, all pages.
Ken Cabeen & Peter Gent, Image Compression and the Discrete Cosine Transform, all pages, 1998.
M. Antonini, Image Coding Using Wavelet Transform , IEEE Transactions on Image Processing, vol. 1, No. 2, Apr. 1992, all pages.
Lance Williams, Pyramidal Parametrics, Computer Graphics, vol. 17, No. 3, Jul. 1983, all pages.
OpenGL Standard Version 1.1, Mar. 1997, available: https://www.opengl.org/documentation/specs/version1.1/glspec1.1/node84.html#SECTION00681100000000000000, all pages.
H. Hoppe, Progressive Meshes, SIGGRAPH '96: Proceedings of the 23rd annual conference on computer graphics and interactive techniques, pp. 99-108, all pages.
OpenGL Standard Version 1.2.1, Apr. 1999, available: https://www.opengl.org/documentation/specs/version1.2/opengl1.2.1.pdf, all pages.
Printout of IEEE Explore citations to Reddy et al., all pages.
Printout of Google Scholar citations to Reddy et al., all pages.
Cover page and authenticating declaration of Reddy et al., from British Library, all pages.
Cover page of Reddy et al. from Linda Hall Library, all pages.
Reddy et al., TerraVision II: Visualizing Massive Terrain Databases in VRML, IEEE Computer Graphics and Applications, Mar./Apr. 1999, pp. 30-38 (all pages).
Related Matters Notice in IPR2016-00448, all pages.
Scheduling Transcript, *Bradium Tech*. v. *Microsoft* Case No. 15-CV-031 (D. Del.), Exh. 2001 in IPR2016-00449 and IPR2016-00448, all pages.
Patent Owner's Preliminary Response in IPR2016-00448, all pages.
Notice of Filing Date Accorded to Petition in IPR2016-00448, all pages.
Patent Owner's Updated Mandatory Notices in IPR2016-00448, all pages.
Curriculum Vitae of William R. Michalson, all pages.
Boris Rabinovich & Craig Gotsman, Visualization of Large Terrains in Resource-Limited Computing Environments (1997), all pages.
User Datagram Protocol (UDP) (Windows CE 5.0, Microsoft, Available: https://msdn.microsoft.com/enus/library/ms885773.aspx [Accessed Apr. 28, 2015] all pages.
Theresa-Marie Rhyne, A Commentary on GeoVRML: A Tool for 3D Representation of FeoReferenced Data on the Web, Int'l J. of Geographic Information Sciences i4 v13 1999 all pages.
Michalson Decl. with Appendices A-I, in IPR2016-00449, U.S. Pat. No. 8,924,506, all pages.
Michalson Decl. Appendices J-KK, in IPR2016-00449, U.S. Pat. No. 8,924,506, all pages.
IPR Petition re U.S. Pat. No. 8,924,506, filed Jan. 11, 2016, IPR2016-00449, all pages.
Patent Owner's Mandatory Notices, Related Matters, IPR2016-00449, all pages.
Patent Owner's Preliminary Response, IPR2016-00449, all pages.
Declaration of Charles Randall Carpenter, Exh. 1015 in IPR2015-01434, all pages.
Notice of Filing Date Accorded to Petition IPR2016-00449, all pages.
Patent Owner's Updated Mandatory Notices, IPR2016-00449, all pages.
Declaration of Dr. Peter Lindstrom, Exh. 1014 in IPR2015-01434, all pages.
Michalson Declaration with Appendices A-O, Exh. 1009 in IPR2015-01434, all pages.
Michalson Declaration Appendices P-FF, Exh. 1008 in IPR2015-01434, all pages.
An Integrated Global GIS and Visual Simulation System by P. Lindstrom et al., Tech. Rep. GIT-GVU-97-07, Mar. 1997, Exh. 1004 in IPR2015-01434, all pages.
d'Arnaud Decl. with Maps Alive: Viewing Geospatial Information on the WWW, Michael Potmesil, Computer Networks and ISDN Systems vol. 29, issues 8-13, pp. 1327-42, all pages.
IPR Petition re U.S. Pat. No. 7,908,343, filed Jun. 16, 2015, IPR2015-01434, all pages.
Patent Owner's Updated Mandatory Notices in IPR2015-01434, all pages.
Michalson Decl. with Appendices A-O, IPR2015-01435, U.S. Pat. No. 8,924,506, all pages.
Michalson Decl. Appendices P-EE, IPR2015-01435, U.S. Pat. No. 8,924,506, all pages.
IPR Petition re U.S. Pat. No. 8,924,506, filed Jun. 16, 2015, IPR2015-00435, all pages.
Notice of Filing Date Accorded to Petition in IPR2015-01435, all pages.
Patent Owner's Preliminary Response in IPR2015-01435, all pages.
Patent Owner's Mandatory Notices, IPR2015-01435, all pages.
Patent Owner's Updated Mandatory Notices, IPR2015-01435, all pages.
Patent Owner's Second Updated Mandatory Notices, IPR2015-01435, all pages.
Patent Owner's Preliminary Response in IPR2015-01434, all pages.
Hon. McNamara et al., Decision Denying Institution of Inter Partes Review in IPR2015-01434, U.S. Pat. No. 7,908,343, Dec. 23, 2015, all pages.
Hon. Chung et al., Decision Denying Institution of Inter Partes Review in IPR2015-01435, U.S. Pat. No. 8,924,506, Dec. 23, 2015, all pages.
Michalson Declaration with Appendices A-I, Exhibit 1005 in IPR2016-00448, U.S. Pat. No. 7,908,343, Jan. 11, 2016, all pages.
Michalson Declaration Appendices J-KK, Exhibit 1005 in IPR2016-00448, U.S. Pat. No. 7,908,343, Jan. 11, 2016, all pages.
Ritter et al., GeoTIFF Format Specification, Rev. 1.0, Specification Ver. 1.8.1, Oct. 1995, all pages.
Adobe Systems Inc., TIFF Revision 6.0, Jun. 1992, all pages.
Eastman Kodak Co., FlashPix Format Specification Ver. 1.0, 1996, all pages.

(56) References Cited

OTHER PUBLICATIONS

The VRML Consortium Inc., The Virtual Reality Modeling Language, ISO/IEC 14772-1:1997, 1997, all pages.
Invalidity Contentions, Exhibit 88, *Bradium Techs. LLC* v. *Microsoft Corp.*, 1:15-cv-00031-RGA (D. Del) (all pages).
Invalidity Contentions, Exhibit 89, *Bradium Techs. LLC* v. *Microsoft Corp.*, 1:15-cv-00031-RGA (D. Del) (all pages).
Invalidity Contentions, Exhibit 90, *Bradium Techs. LLC* v. *Microsoft Corp.*, 1:15-cv-00031-RGA (D. Del) (all pages).
Invalidity Contentions, Exhibit 91, *Bradium Techs. LLC* v. *Microsoft Corp.*, 1:15-cv-00031-RGA (D. Del) (all pages).
Maps Alive: Viewing Geospatial Information on the WWW, Michael Potmesil, Bell Labs., http: //www.ra.ethz.chlcdstore/www6/technicallpaper 130/paper130.html (all pages), 1997.
Thakkar, Vaishali; Quadtrees, Octrees and their applications in DIP. Presentation slides, Apr. 22, 1998, all pages.
Levanon, Isaac and Lavi, Yoni; U.S. Appl. No. 60/258,465, filed Dec. 26, 2000, Request for Filing a Provisional Application or Patent Under 37 CFR §1.53 c—Optimization T-Junction Cracking-Problem of Image Parcels Being Packet Streamed by Utilizing Quadtree Scheme.
Levanon, Isaac and Lavi, Yoni; U.S. Appl. No. 60/258,468, filed Dec. 26, 2000, Request for Filing a Provisional Application or Patent Under 37 CFR §1.53 c—Multiple Parallel Download of Target Image Parcels Streamed Over Limited and Narrowband Communications Channels.
TIMPF, Sabine and Frank, Andrew U.; Using hierarchical spatial data structures for hierarchical spatial reasoning. Spatial Information Theory—A Theoretical Basis for GIS (International Conference COSIT97); S. C. Hirtle and A.U. Frank. Berlin-Heidelberg, Springer-Verlag. Lecture Notes in Computer Science 1329: 69-83; Apr. 2006; Dept. of Geoinformation, Technical University Vienna.
Rauschenbach, Uwe; Progressive Image Transmission Using Levels of Detail and Regions of Interest; University of Rostock, Computer Science Department, D-18051 Rostock, Germany, all pages, 1998.
Sivan, Ron; Surface Modeling Using Quadtrees; Feb. 1996; Computer Vision Laboratory, Center for Automation Research, University of Maryland, College Park, MD, all pages.
Baumann, Peter, Web-enabled Raster GIS Services for Large Image and Map Databases. 5th Int'l Workshop on Query Processing and Multimedia Issues in Distributed Systems (QPMIDS'2001); Sep. 3-4, 2001; Active Knowledge GmbH, Kirchenstr. 88, D-81675 Munich, Germany, all pages.
Chang, Tianhorng and Kuo, C.-C. Jay; Texture Analysis and Classification with Tree-Structured Wavelet Transform. IEEE Transactions on Image Processing, vol. 2, No. 4, Oct. 1993; IEEE, all pages.
ESRI; ESRI Data & Maps 1999. An ESRI White Paper—Sep. 1999, Sep. 1999, Environmental Systems Research Institute, Inc., all pages.
Dürst, Martin J.; A New Method for Image Compression and Progressive Transmission. Dissertation submitted to the Graduate School of the University of Tokyo in Partial Fulfillment of the Requirements for the Degree of Doctor of Science in Information Science, Jun. 1990, all pages.
Heckbert, Paul. Course Organizer; Multiresolution Surface Modeling. Course Notes for SIGGRAPH '97, Los Angeles, California, Aug. 5, 1997, all pages.
Gorte, Ben G.H.; Multi-spectral Quadtree based Image Segmentation. International Archives of Photogrammetry and Remote Sensing. vol. XXXI, Part B3. Vienne 1996, International Institute for Aerospace Survey and Earth Sciences (ITC), Enschede, the Netherlands, 1996, all pages.
Misenti, Meg; 3-D GIS system throws public discourse in relief. http://web.archive.org/web/19990224153934/http:///www.fcw-civic.com/pubs/nov97/civ-gis-11-1-1997.html, FCW Government Technology Group. FCW.com, Nov. 1997, all pages.
Laws, Kenneth I.; Integrated Split/Merge Image Segmentation. Technical Note 441. SRI Projects 2000 and 8388, SRI International, Artificial Intelligence Center, Computer and Information Science, 333 Ravenswood Ave., Menlo Park, CA 94025, Jul. 1998, all pages.

Nebiker, Stephan; Spatial Raster Data Management for Geo-Information Systems—A Database Perspective. Dissertation ETH No. 12374. A dissertation submitted to the Swiss Federal Institute of Technology for the degree of Doctor of Technical Sciences, all pages, 1997.
Liang, Kai-Chieh and Kuo, C.-C. Jay; WaveGuide: A Joint Wavelet-Based Image Representation and Description System. IEEE Transactions on Image Processing, vol. 8, No. 11, Nov. 1999, IEEE, all pages.
Bouman, Charles A. and Shapiro, Michael; A Multiscale Random Field Model for Bayesian Image Segmentation. IEEE Trans. On Image Processing, vol. 3, No. 2, pp. 162-177, Mar. 1994.
To, Danny S.P.; Lau, Rynson W.H. and Green, Mark; A Method for Progressive and Selective Transmission of Multi-Resolution Models, Danny S.P. To and Rynson W.H. Lau, Department of Computer Science, City University of Hong Kong, Hong Kong; Mark Green, Department of Computer Science, University of Alberta, Canada, 1999, all pages.
Boelitz, Carole and Beck, Eric V.; Orbit Analysis Software Index. Final Report. PL-TR-95-1139, Rev. 1, vol. II, Phillips Laboratory, Space Technology Directorate, Air Force Materiel Command, Kirtland Air Force Base, NM 8117-5776, Jul. 1997, all pages.
Martin, Ioana M.; IBM Research Report. Adaptive Rendering of 3D Models Over Networks Using Multiple Modalities. RC 21722 (Log 97821), IBM Research Division, IBM T.J. Watson Research Center, P.O. Box 704, Yorktown Heights, NY 10598, Apr. 11, 2000, all pages.
Aftosmiss, M. J.; Solution Adaptive Cartesian Grid Methods for Aerodynamic Flows with Complex Geometries. Von Karman Institute for Fluid Dynamics, Lecture Series Feb. 1997, 28th computational fluid dynamics, M. J. Aftosmis, USAF/NASA Research Center, Mail Stop T27B-2, Moffett Field, CA 94035-1000, Mar. 3-7, 1997, all pages.
Deren, Li and Jianya, Gong; An Unified Data Structure Based on Linear Quadtrees. EARSel. Advances in Remote Sensing, vol. 1, No. 3-VIL, 1992, Li Deren and Gong Jianya, Department of Photogrammetry and Remote Sensing, Wuhan Technical University of Surveying and Mapping, Wuhan, China, all pages.
Barclay, Tom; Eberl, Robert, et al.; The Microsoft TerraServer™. Technical Report MSR-TR-98-17, Jun. 1998, Microsoft Research, Microsoft Corporation, One Microsoft Way, Redmond, WA 98052, all pages.
Barclay, Tom; Gray, Jim and Slutz, Don; Microsoft TerraServer: A Spatial Data Warehouse, Tom Barclay, Jim Gray and Don Slutz, Microsoft Research, 301 Howard St., Suite 830, San Francisco, CA 94105, all pages, 1999.
Cohen, Daniel and Gotsman, Craig; Photorealistic Terrain Imaging and Flight Simulation. IEEE Computer Graphics and Applications, Mar. 1994, all pages.
Cohen-OR, Daniel; Rich, Eran; Lerner, Uri; Shenkar, Victor; A Real-Time Photo-Realistic Visual Flythrough. IEEE Transactions on Visualization and Computer Graphics, vol. 2, No. 3, Sep. 1996, all pages.
Deshpande, Sachin and Zeng, Wenjun; Scalable Streaming of JPEG2000 Images using Hypertext Transfer Protocol, Sachin Deshpande and Wenjun Zeng, Sharp Laboratories of America, Inc. 5750 NW, Pacific Rim Blvd., Camas, WA, all pages, 2001.
Reddy, Martin; Leclerc, Yvan G. et al.; Modeling the Digital Earth in VRML, SRI International, 333 Ravenswood Ave., Menlo Park, CA 94025, all pages, 2000.
Hoppe, Hugues; Efficient Implementation of Progressive Meshes. Jan. 1998, Technical Report MSR-TR-98-02., Microsoft Research, Microsoft Corporation, One Microsoft Way, Redmond, WA 98052, all pages.
Gross, Markus H.; Staadt, Oliver G.; Gatti, Roger; Efficient Triangular Surface Approximations using Wavelets and Quadtree Data Structures. Reprint: IEEE Transactions on Visualization and Computer Graphics, vol. 2, No. 2, Jun. 1996, pp. 130-143.
Barnell, Brad; ArcView 3D Analyst Used in Virtual Reality Models. http://web.archive.org/web/19990302022552/http://www.esri.com/news/arcnews/summer98articles/03-av3danalyst.html, Aug. 7, 1998, Environmental Systems Research Institute, Inc.

(56) References Cited

OTHER PUBLICATIONS

Ormsby, Tim and Alvi, Jonell; Extending ArcView GIS, 1993, ESRI Press, all pages.

Gang, Chen; Gang, Wan; Zhiqiang, Wu; An Integrated Global Visual Simulation System Based on Map Data, Chen Gang, Wan Gang and Wu Zhiqiang, Department of Cartography, Institute of Surveying and Mapping, 66 Longhai Road, Zhengzhou 450052, P.R. China, all pages, 2001.

Falby, John S.; Zyda, Michael J.; Pratt, David R.; Mackey, Randy L; NPSNET: Hierarchical Data Structures for Real-Time Three-Dimensional Visual Simulation. In Computer & Graphics, vol. 17, No. 1, pp. 65-69; John S. Falby et al., Naval Postgraduate School, Code CSZk, Dept. of Computer Science, Monterey, CA 93943-5100, all pages, 1993.

Breslin, Pat; Frunzi, Nick; Napolean, Eileen; Ormsby, Tim; Getting to Know ArcView GIS—the geographic information system (GIS) for everyone™, 1998, ESRI Press, all pages.

González, Agustin José; Abdel-Wahab, Hussein and Wild, J. Christian; Scalable and Resilient Application Sharing System for Internet Collaboration, Agustin José González, Electronic Engineering Department, Universidad Técnica Federico Santa Maria, Valparaiso, Chile; Hussein Abdel-Wahab and J. Christian Wild, Computer Science Department, Old Dominion University, Norfolk, VA, all pages.

Hildebrandt, John; Grigg, Mark; et al.; Dynamic C2 application of Imagery and GIS information using backend repositories, John Hildebrandt et al., Information Technology Division, Defence Science and Technology Organisation; OSTO C3 Research Centre, Fernhill Park, Department of Defence, Canberra Act 2600, Australia, all pages.

Summers, Cathy and Poreca, Matt; Press Release. Launch of ImagePump™ Provides Visually Rich, Interactive Solutions for E-Commerce Sites. https://web.archive.org/web/20011203114858/http://www.xippix.com/HTML/PressRoom/PressReleases/PressReleases01.htm, Apr. 3, 2000, Xippix, Inc.

Furht, Borko; Wang, Yingli; Celli, Joe; Interactive Progressive Encoding System for Transmission of Complex Images, Borko Furht and Yingli Wang, NSF Multimedia Laboratory, Florida Atlantic University, Boca Raton, FL 33431; Joe Celli, IBM, Boca Raton, FL.

d'Arnaud, Judea; Declaration of Judea d'Arnaud in Support of Petition for Inter Partes Review of U.S. Pat. No. 7,139,794 B2, 7,908,343 B2, and 8,924,506 B2. Before the Patent Trial and Appeal Board of the USPTO, Microsoft Corporation, *Petitioner* v *Bradium Technologies LLC*, Patent Owner, May 12, 2014, all pages.

Lindstrom, Dr. Peter; Declaration of Dr. Peter Lindstrom Regarding 1997 Article Entitled "An Integrated Global GIS and Visual Simulation System" Before the Patent Trial and Appeal Board, Jun. 9, 2015, all pages.

Carpenter, Charles Randall; Declaration of Charles Randall Carpenter Regarding 1997 Article Entitled "An Integrated Global GIS and Visual Simulation System" Before the Patent Trial and Appeal Board, Jun. 11, 2015, all pages.

Kaneda, Kazufumi; Kato, Fujiwa; et al.; Three Dimensional Terrain Modeling and Display for Environmental Assessment. Computer Graphics, vol. 23, No. 3, Jul. 1989, all pages.

Kennard, Douglas J. and Barrett, William A.; Just-In-Time Browsing for Digital Images. Proceedings of the Data Compression Conference (DCC'01) IEEE, 2001, Douglas J. Kennard and William A. Barrett, Department of Computer Science, Brigham Young University, all pages.

Pajarola, Renato; Large scale Terrain Visualization using the Restricted Quadtree Triangulation, Feb. 1998, Renato Pajarola, Eidgenössische Technische Hochschule Zurich (Institute of Theorectical Computer Science, ETH, Zürich, Switzerland, all pages.

To, Danny; Lau, Rynson W.H. and Green, Mark; An Adaptive Multiresolution Method for Progressive Model Transmission, Danny To and Rynson W.H. Lau, Department of Computer Science, City University of Hong Kong, Hong Kong; Mark Green, Department of Computer Science, University of Alberta, Canada, all pages, 2001.

Lemaire, E.D. and Jeffreys, Y.; Low-bandwidth telemedicine for remote orthotic assessment. Prosthetics and Orthotics International. 1998. 22. 155-167, E.D. Lemaire and Y. Jeffreys, The Rehabilitation Centre, Ottawa, Ontario, Canada, all pages.

Macedonia, Michael R.; Zyda, Michael J.; et al.; NPSNET: A Network Software Architecture For Large Scale Virtual Environments. In Presence, vol. 3, No. 4, Fall 1994, Michael R. Macedonia, et al., Naval Postgraduate School, Department of Computer Science, Monterey, CA 93943-5100, all pages.

Machiraju, Raghu; Fowler, James E. et al.; EVITA: A Prototype System for Efficient Visualization and Interogation of Terascale Datasets, all pages, 2000.

Ofek, Eyal; Shilat, Erez; et al.; Multiresolution Textures from Image Sequences. IEEE Computer Graphics and Application, Mar.-Apr. 1997, all pages.

Hoppe, Hugues; View-Dependent Refinement of Progressive Meshes, Microsoft Research, all pages, 1997.

Barclay, Tom; Gray, Jim and Slutz, Don; Microsoft TerraServer: A Spatial Data Warehouse. Jun. 1999, Revised Feb. 2000. Technical Report MS-TR-99-29, Microsoft Research, Microsoft Corporation, One Microsoft Way, Redmond, WA 98052, all pages.

Asche, Ruediger R.; Multithreading Performance, Jan. 31, 1996, Microsoft Developer Network Technology Group, all pages.

Macedonia, Michael R.; Brutzman, Donald P.; et al.; NPSNET: A Multi-plaer 3D Virtual Environment Over the Internet. In the Proceedings of the ACM-1995 Symposium on Interactive 3D Graphics, Apr. 9-12, 1995, Monterey, CA, Naval Postgraduate School, Department of Computer Science, Monterey, CA 93943-5100, all pages.

Clarke, Malcolm; Fragos, Aristeides; et al.; Optimum Delivery of Telemedicine over Lowe Bandwidth Links, Brunel University, UK, all pages, 2000.

Oskard, David N.; Hong, Tsai-Hong; Shaffer, Clifford A.; Real-Time Algorithms and Data Structures for Underwater Mapping. IEEE Transactions on Systems, Man, and Cybernetics, vol. 20, No. 6, Nov./Dec. 1990, pp. 1469-1475, all pages.

Samet, Hanan and Webber, Robert E.; Storing a Collection of Polygons Using Quadtrees. ACM Transactions on Graphics, vol. 4, No. 3, Jul. 1985, pp. 182-222., Association for Computing Machinery.

Turner, Charles J. and Peterson, Larry L; Image Transfer: An End-to-End Design, 1992, Association for Computing Machinery.

Hoppe, Hugues; Smooth View-Dependent Level-of-Detail Control and Its Application to Terrain Rendering, 1998, IEEE, all pages.

Pearlman, William A.; Trends of Tree-Based, Set-Partitioning Compression Techniques in Still and Moving Image Systems, Center for Next Generation Video, Electrical Computer and System Engineering Department, Rensselaer Polytechnic Institute, Troy, NY 12180-3590, all pages, 2001.

Penny, Simon; From A to D and back again: The emerging aesthetics of Interactive Art, First published in Leonardo Electronic Alamanac Apr. 1996 and NextWave catalog, May 1996, Melbourne Australia, all pages.

Hoppe, Hugues; Progressive Meshes, Microsoft Research, all pages, 1996.

Potmesil, M; Maps alive: viewing geospatial information on the WWW. Computer Networks and ISDN Systems; Papers from the Sixth International World Wide Web Conference,vol. 29, Issue 8-13, Sep. 1997, pp. 1327-1342, Elsevier Science B.V.

Potmesil, M; Maps alive: viewing geospatial information on the WWW. Computer Networks and ISDN Systems 29 (1997)1327-1342, Elsevier Science B.V.

Prandolini, Robert; AU, T. Andrew; et al.; Use of UDP for efficient imagery dissemination, Use of UDP for efficient imagery dissemination, all pages, 2000.

Barclay, Tom; Gray, Jim; et al.; Microsoft Terra Server. Presentation slides format, Microsoft, all pages.

(56) References Cited

OTHER PUBLICATIONS

Shaffer, Clifford A.; Samet, Hanan; Nelson, Randal C.; Quilt: a geographic information system based on quadtrees. Int. J. Geographical Information Systems, 1990, vol. 4, No. 2, 103-131, Taylor & Francis Ltd., all pages.
Rauschenbach, Uwe; The Rectangular Fish Eye View as an Efficient Method for the Transmission and Display of Large Images, University of Rostock, Computer Science Department, D-18051 Rostock, Germany, all pages, 1999.
Geisler, Wilson S. and Perry, Jeffrey S.; A real-time foveated multiresolution system for low-bandwidth video communication, Center for Vision and Image Sciences, University of Texas, Austin, TX 78712, all pages, 1998.
Zhang, Jianguo; Stahl, Johannes N.; et al.; Real-Time Teleconsultation with High-Resolution and Large-Volume Medical Images for Collaborative Healthcare. IEEE Transactions on Information Technology in Biomedicine, vol. 4, No. 2, Jun. 2000, all pages.
Fox, Armando and Brewer, Eric A.; Reducing WWW Latency and Bandwidth Requirements by Real-Time Distillation. Fifth International World Wide Web Conference, May 6-10, 1996, Paris, France, University of California, Berkeley, all pages.
Samet, Hanan; Webber, Robert E.; Data Structures. Hierarchical Data Structures and Algorithms for Computer Graphics, Part I: Fundamentals. IEEE Computer Graphics & Applications, 1988, IEEE Xplore® Digital Library, all pages.
Schneider, Bengt-Olaf and Martin, Ioana M.; An adaptive framework for 3D graphics over networks. Computers & Graphics 23 (1999) 867-874, Elsevier Science Ltd., all pages.
Sethuraman, Sriram; Siegel, M.W.; Jordan, Angel G.; A multiresolutional region based segmentation scheme for stereoscopic image compression. Published in SPIE vol. 2419—Digital Video Compression—Algorithms and technologies in 1995, Sriram Sethuraman et al., Department of Electrical and Computer Engineering, The Robotics Insstitute, School of Computer Science, Carnegie Mellon University, Pittsburgh, PA 15213, all pages.
Shum, Heung-Yeung; Szeliski, Richard; et al.; Interactive 3D Modeling from Multiple Images Using Scene Regularities, Heung-Yeung Shum, Richard Szeliski and P. Anandan—Microsoft Research; Simon Baker—Columbia University; Mei Ilan—Carnegie Mellon University, all pages, 1998.
Slowe, Thomas E. and Marsic, Ivan; Saliency-Based Visual Representation for Compresion., 1997, Thomas E. Slowe, The Media Laboratory, Massachusetts Institute of Technology, Cambridge, MA; Ivan Marsic, CAIP Center, Rutgers University, Piscataway, NJ, all pages.
Woodrow, Edward; Chen, Lei; et al.; SPIN-IT: The PRISM Project Network Protocol for Image Retrieval, Edward Woodrow, Lei Chen and Wendi Heinzelman—University of Rochester; Sundar Venkataraman, Charles Judice and Joseph Wilder—Rutgers University, all pages, 2002.
Basu, Anup and Cheng, Irene; Super High Resolution 3D Imaging and Efficient Visualization, TelePhotogenics Inc., #280 SunLife Place, Edmonton, Alberta, Canada T5K 3J1, all pages, 2001.
Durand, Frédo; A Multidisciplinary Survey of Visibility. Extract of the PhD dissertation—3D Visibility: Analytical Study and Applications. Université Joseph Fourier, Grenoble, France. Siggraph '2000 course notes on Visibility, all pages.
Chee, Y.-Kheong, Survey of Progressive Image Transmission Methods, 1999, John Wiley & Sons, Inc., all pages.
Hoppe, Hugues; Smooth View-Dependent Level-of-Detail Control and Its Application to Terrain Rendering, Smooth View-Dependent Level-of-Detail Control and Its Application to Terrain Rendering, all pages, 1998.
Leclerc, Yvan G.; Lau Jr., Steven Q.; TerraVision: A Terrain Visualization System. SRI International, Technical Note No. 540, Apr. 22, 1994, SRI International, 333 Ravenswood Avenue, Menlo Park CA 94025-3493, all pages.
Gore, Al; The Digital Earth: Understanding our planet in the 21st Century. Given at the California Science Center, Los Angeles, California on Jan. 31, 1998, all pages.
Leclerc, Yvan G.; Tile Set Definitions. SRI International, Technical Note No. 541, Apr. 28, 1994, SRI International, 333 Ravenswood Avenue, Menlo Park CA 94025-3493, all pages.
Bowman, Charles A.; Shapiro, Michael; A Multiscale Random Field Model for Bayesian Image Segmentation., Dec. 2, 1996, Charles A. Bowman, School of Electrical Engineering, Purdue University, West Lafayette, In; Michael Shapiro, US Army CERL, P.O. Box 9005, Champaign, IL 61826-9005.
Wu, Dapeng; Hou, Yiwei Thomas; Zhang, Ya-Qin; Transporting Real-Time Video over the Internet: Challenges and Approaches Proceedings of the IEEE, vol. 88, No. 12, Dec. 2000, all pages.
Koller, David; Lindstrom, Peter; et al.; Virtual GIS: A Real-Time 3D Geographic Information System. Proceedings of the 6th IEEE Visualization Conference (Visualization '95), pp. 94-100.
Gobbetti, Enrico and Leone, Andrea O.; Virtual Sardinia: A Large-Scale Hypermedia Regional Information System. Fifth International World Wide Web Conference, May 6-10, 1996, Paris, France; Enrico Gobbetti, UMBC, CSEE Dept., Baltimore USA—CESDIS, NASA GSFC, Greenbelt, USA; Andrea O. Leone, Centre for Advanced Studies, CRS4, Research and Development in Sardinia, Caglilari, Italy, all pages.
Faloutsos, Christos and Gaede, Volker; Analysis of n-dimensional Quadtrees Using the Hausdorff Fractal Dimension, Feb. 18, 1996, Christos Faloutsos, Department of Computer Science, University of Maryland, College Park, MD; Volker Gaede, Institut für Wirtschaftsinformatik, Humboldt-Universität zu Berlin, Spandauer Str. 1, 10178 Berlin, Germany, all pages, 1996.
Ye, Tao; Jacobsen, H.-Arno; Katz, Randy; Mobile awareness in a wide area wireless network of info-stations. pp. 109-120, Tao Ye, Computer Science Devision, UC Berkeley; H.-Arno Jacobsen, ICSI 1947 Center Street, Suite 300, Berkeley, CA; Randy Katz, Computer Science Devision, UC Berkeley, 1998.
Barclay, Tom; Eberl, Robert, et al.; Microsoft TerraServer, SQL Server 7.0, Microsoft Developer Network, Jun. 1998, Microsoft, all pages.
Kerski, Joseph J., Ph.D.; Downloading & Formatting Earth Images from Terraserver for Recreational, Scientific, Educational & GIS Use, U.S. Department of the Interior, Bureau of Land Management, Wyoming, all pages.
Barclay, Tom; Gray, Jim; Slutz, Don; Microsoft TerraServer: A Spatial Data Warehouse. Technical Report MS-TR-99-29, Jun. 1999, Microsoft TerraServer: A Spatial Data Warehouse. Technical Report MS-TR-99-29, all pages.
Minami, Michael; Using ArcMap™ GIS by ESRI™, 2000, Environmental Systems Research Institute, Inc., all pages.
Barclay, Tom; Eberl, Robert, et al.; Microsoft TerraServer, Sep. 5, 1998, Cornell University Library, all pages.
Moore et al., Decision Re Institution of Inter Partes Review U.S. Pat. No. 7,908,343, IPR2016-00448 (Jul. 25, 2016).
Chung et al., Decision Re Institution of Inter Partes Review, U.S. Pat. No. 8,924,506, IPR2016-00449 (Jul. 27, 2016).
Asher, Oren; U.S. Appl. No. 09/976,169 for Method and System for Peer-to-Peer Image Streaming. Date of Deposit Oct. 11, 2001 via Express Mail to the USPTO.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 01—*U.S. Pat. No. 9,253,239* vs. *Yaron and Anwar*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 02—*U.S. Pat. No. 9,253,239* vs. *Tarantino and Denninghoff and Yaron*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 03—*U.S. Pat. No. 9,253,239* vs. *Yap and Rabinovich*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 04—*U.S. Pat. No. 9,253,239* vs. *The TerraVision system and ArcView*, all pages.
Claim Chart, Defendant Microsoft Corporation's Initial Invalidity Contentions, *Bradium Technologies LLC v. Microsoft Corporation*,

(56) References Cited

OTHER PUBLICATIONS

C.A. No. 15-031-RGA, Jun. 6, 2016, Exhibit 05—*U.S. Pat. No. 9,253,239* vs. *The TerraVision system and Hornbacker*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 06—*U.S. Pat. No. 9,253,239* vs. *Rutledge, Ligtenberg, and Cooper*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 07—*U.S. Pat. No. 9,253,239* vs. *Rutledge, Ligtenberg, Cooper, and Migdal*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 08—*U.S. Pat. No. 9,253,239* vs. *Rutledge, Ligtenberg, Cooper, and Hassan*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 09—*U.S. Pat. No. 9,253,239* vs. *Rutledge, Ligtenberg, Cooper, and Austreng*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 10—*U.S. Pat. No. 9,253,239* vs. *Reddy and ArcView*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 11—*U.S. Pat. No. 9,253,239* vs. *Reddy and Hornbacker*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 12—*U.S. Pat. No. 9,253,239* vs. *Potmesil, Hornbacker, and Lindstrom*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 13—*U.S. Pat. No. 9,253,239* vs. *the MapsAlive System, Hornbacker, and the VGIS system*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 14—*U.S. Pat. No. 9,253,239* vs. *the Magic Project system and Hornbacker*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 15—*U.S. Pat. No. 9,253,239* vs. *the Magic Project System, Hornbacker and Lawless*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 16—*U.S. Pat. No. 9,253,239* vs. *Fuller, Hornbacker and Lawless*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 17—*U.S. Pat. No. 9,253,239* vs. *Fuller and Hornbacker*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 18—*U.S. Pat. No. 9,253,239* vs. *Dekel*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 19—*U.S. Pat. No. 9,253,239* vs. *Asher*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 20—*U.S. Pat. No. 9,253,239* vs. *The ArcView system*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 21—*U.S. Pat. No. 9,253,239* vs. *Barclay II and Asche and Rutledge*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 22—*U.S. Pat. No. 9,253,239* vs. *the TerraServer system and Asche and Rutledge*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 23—*U.S. Pat. No. 9,253,239* vs. *Barclay and Asche and Rutledge*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 24—*U.S. Pat. No. 8,924,506* vs. *Yaron*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 25—*U.S. Pat. No. 8,924,506* vs. *Tarantino*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 26—*U.S. Pat. No. 8,924,506* vs. *Tarantino*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 27—*U.S. Pat. No. 8,924,506* vs. *the TerraVision system*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 28—*U.S. Pat. No. 8,924,506* vs. *the TerraVision systen and Hornbacker*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 29—*U.S. Pat. No. 8,924,506* vs. *Rutledge, Ligtenberg, and Cooper*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 30—*U.S. Pat. No. 8,924,506* vs. *Reddy*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 31—*U.S. Pat. No. 8,924,506* vs. *Reddy and Hornbacker*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 32—*U.S. Pat. No. 8,924,506* vs. *the Magic Project system and Hornbacker*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 33—*U.S. Pat. No. 8,924,506* vs. *Potmesil, Hornbacker, and Lindstrom*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 34—*U.S. Pat. No. 8,924,506* vs. *the MapsAlive system, Hornbacker, and the VGIS system*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 35—*U.S. Pat. No. 8,924,506* vs. *Fuller and Hornbacker*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 36—*U.S. Pat. No. 8,924,506* vs. *Dekel*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 37—*U.S. Pat. No. 8,924,506* vs. *The ArcView system*, all pages.
Claim Chart, Defendant Microsoft Corporation's Initial Invalidity Contentions, *Bradium Technologies LLC v. Microsoft Corporation*, C.A. No. 15-031-RGA, Jun. 6, 2016, Exhibit 38—*U.S. Pat. No. 8,924,506* vs. *TerraServer system*, all pages.

(56) References Cited

OTHER PUBLICATIONS

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 39—*U.S. Pat. No. 8,924,506* vs. *Barclay*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 40—*U.S. Pat. No. 8,924,506* vs. *Barclay II*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 41—*U.S. Pat. No. 7,908,343* vs. *Yaron and Anwar*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 42—*U.S. Pat. No. 7,908,343* vs. *Tarantino*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 43—*U.S. Pat. No. 7,908,343* vs. *Yap and Rabinovich*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 44—*U.S. Pat. No. 7,908,343* vs. *the TerraVision system*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 45—*U.S. Pat. No. 7,908,343* vs. *the TerraVision system and Hornbacker*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 46—*U.S. Pat. No. 7,908,343* vs. *Rutledge, Ligtenberg, and Cooper*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 47—*U.S. Pat. No. 7,908,343* vs. *Rutledge, Ligtenberg, Cooper and Austreng*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 48—*U.S. Pat. No. 7,908,343* vs. *Reddy*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 49—*U.S. Pat. No. 7,908,343* vs. *Reddy and Hornbacker*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 50—*U.S. Pat. No. 7,908,343* vs. *the Magic Project system and Hornbacker*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 51—*U.S. Pat. No. 7,908,343* vs. *the Magic Project System, Hornbacker and Lawless*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 52—*U.S. Pat. No. 7,908,343* vs. *Potmesil, Hornbacker, and Lindstrom*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 53—*U.S. Pat. No. 7,908,343* vs. *Potmesil and Hornbacker*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 54—*U.S. Pat. No. 7,908,343* vs. *the MapsAlive System and Hornbacker*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 55—*U.S. Pat. No. 7,908,343* vs. *Fuller, Hornbacker and Lawless*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 56—*U.S. Pat. No. 7,908,343* vs. *Fuller and Hornbacker*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 57—*U.S. Pat. No. 7,908,343* vs. *the MapsAlive system, Hornbacker, and the VGIS system*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 58—*U.S. Pat. No. 7,908,343* vs. *Dekel*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 59—*U.S. Pat. No. 7,908,343* vs. *the ArcView system and Denninghoff*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 60—*U.S. Pat. No. 7,908,343* vs. *TerraServer system*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 61—*U.S. Pat. No. 7,908,343* vs. *Barclay II*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 62—*U.S. Pat. No. 7,908,343* vs. *Barclay*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 63—*U.S. Pat. No. 7,139,794* vs. *Yaron*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 64—*U.S. Pat. No. 7,139,794* vs. *ViRGIS*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 65—*U.S. Pat. No. 7,139,794* vs. *Tarantino.*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 66—*U.S. Pat. No. 7,139,794* vs. *Skoll*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 67—*U.S. Pat. No. 7,139,794* vs. *Pajarola*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 68—*U.S. Pat. No. 7,139,794* vs. *Yap and Rabinovich*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 69—*U.S. Pat. No. 7,139,794* vs. *the TerraVision system*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 70—*U.S. Pat. No. 7,139,794* vs. *the TerraVision system and Hornbacker*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 71—*U.S. Pat. No. 7,139,794* vs. *Rutledge, Ligtenberg, Cooper and Migdal*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 72—*U.S. Pat. No. 7,139,794* vs. *Reddy*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 73—*U.S. Pat. No. 7,139,794* vs. *Reddy and Hornbacker*, all pages.

(56) References Cited

OTHER PUBLICATIONS

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 74—*U.S. Pat. No. 7,139,794* vs. *the Magic Project system and Hornbacker*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 75—*U.S. Pat. No. 7,139,794* vs. *Potmesil, Hornbacker, and Lindstrom*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 76—*U.S. Pat. No. 7,139,794* vs. *the MapsAlive system, Hornbacker, and the VGIS system*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 77—*U.S. Pat. No. 7,139,794* vs. *Fuller and Hornbacker*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 78—*U.S. Pat. No. 7,139,794* vs. *Dekel*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 79—*U.S. Pat. No. 7,139,794* vs. *the ArcView system*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 80—*U.S. Pat. No. 7,139,794* vs. *the TerraServer system*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 81—*U.S. Pat. No. 7,139,794* vs. *Barclay*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 82—*U.S. Pat. No. 7,139,794* vs. *Barclay II*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 83—*U.S. Pat. No. 9,253,239* vs. *Potmesil*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 84—*U.S. Pat. No. 9,253,239* vs. *the MapsAlive system*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 85—*U.S. Pat. No. 9,253,239* vs. *Lindstrom*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 86—*U.S. Pat. No. 9,253,239* vs. *the VGIS system*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 87—*U.S. Pat. No. 8,924,506* vs. *Lindstrom*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 88—*U.S. Pat. No. 8,924,506* vs. *The VGIS System*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 89—*U.S. Pat. No. 8,924,506* vs. *Potmesil*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 90—*U.S. Pat. No. 8,924,506* vs. *The MapsAlive system*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 91—*U.S. Pat. No. 7,908,343* vs. *the MapsAlive System*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 92—*U.S. Pat. No. 7,908,343* vs. *Lindstrom*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 93—*U.S. Pat. No. 7,908,343* vs. *Potmesil*, all pages.

Claim Chart, Defendant Microsoft Corporation's Initial Invalidity Contentions, *Bradium Technologies LLC* v. *Microsoft Corporation*, C.A. No. 15-031-RGA, Jun. 6, 2016, Exhibit 94—*U.S. Pat. No. 7,908,343* vs. *The VGIS System*, all pages.

Defendant Microsoft Corporation's Initial Invalidity Contentions, *Bradium Technologies LLC* v. *Microsoft Corporation*, Jun. 6, 2016, all pages.

U.S. Appl. No. 60/109,077, from which U.S. Pat. No. 6,728,960 claims priority, filed Nov. 18, 1998 according to USPTO, all pages.

First Amended Complaint, *Bradium Technologies LLC.* v. *Microsoft Corporation*, Case No. 1:15-cv-00031-RGA, U.S. District Court for the District of Delaware, Mar. 14, 2016, all pages.

Declaration of Prof. William R. Michaelson in Support of Petition for Inter Partes Review of U.S Pat. No. 9,253,239, PTAB Case No. IPR2016-01897, Sep. 30, 2016, with Appendices (all parts), all pages.

Petition for Inter Partes Review of U.S. Pat. No. 9,253,239, PTAB Case No. IPR2016-01897, all pages.

Marc H. Brown and Robert A. Shillner, "DeckScape: an experimental Web browser," Computer Networks and ISDN Systems 27 (1995) 1097-1104 (App. LL to Declaration of Prof. William R. Michaelson).

Declaration of Isaac Levanon (Isaac Decl.)—Public Version; all pages.

Public Version—Corrected Patent Owner Response; all pages.

Petitioner's Objections to Patent Owner's Evidence; all pages.

Patent Owner Response (Public Version); all pages.

IPR2016-00448, Exhibit 2071, Nov. 15, 2016; 3DVU YouTube Video: Navi2Go Mobile in UK a 3DVU video, dated Jan. 28, 2008, all pages.

IPR2016-00448, Exhibit 2070, Nov. 15, 2016; 3DVU YouTube Video: 3DVU Image Navigation fuels Kenwood Systems in Japan, dated Aug. 22, 2006, all pages.

IPR2016-00448, Exhibit 2069, Nov. 15, 2016; 3DVU YouTube Video: Navi2Go in Action, dated Jul. 27, 2007, all pages.

Declaration of Dr. Peggy Agouris; all pages.

VRML Terrain Modeling for the Montery Bay National Marine Sanctuary (MBNMS); all pages.

Maguire, Geographic Information Systems Principles and Applications (vol. 1); all pages.

Maguire, Geographic Information Systems Principles and Applications (vol. 2); all pages.

White, Compression and Progressive Transmission of Astronomical Images; all pages.

PricewaterhouseCoopers webpage; all pages.

Statista webpage; all pages.

Frost & Sullivan webpage; all pages.

Declaration of Inventors; all pages.

Declaration of Inventors pursuant to 37 C.F.R. 1.131 with Exhibits, in U.S. Pat. No. 7,139,794, dated Jun. 13, 2006; all pages.

Directions Magazine webpage; all pages.

SIIRD Proposal, dated Jul. 31, 2001; all pages.

SIIRD Mutual Nondisclosure Agreement (2002); all pages.

SIIRD Memorandum of Understanding (2002); all pages.

SIIRD Commercialization Report, dated Mar. 23, 2006; all pages.

KORIL-RDF Proposal, dated Jan. 31, 2005; all pages.

KORIL-RDF Cooperation and Project Funding Agreement; all pages.

Silicom Ventures webpage; all pages.

Printout of YouTube webpage, 3DVU Image Navigation fuels Kenwood Systems in Japan, dated Aug. 22, 2006; all pages.

(56) References Cited

OTHER PUBLICATIONS

PRweb webpage; all pages.
MapQuest Non-Disclosure Agreement, dated Jul. 15, 2005; all pages.
C.E. Unterberg, Towbin, Keyhole Deal Value Analysis, dated Oct. 28, 2005; all pages.
C.E. Unterberg, Towbin, Valuation Summary Regarding 3DVU, dated Sep. 26, 2005; all pages.
Daewoo Precision Industries Co., Ltd. License and Service Agreement, dated Aug. 29, 2005; all pages.
GIS Development: Asia Pacific: The Monthly Magazine on Geographic Information Science, vol. 10, Issue 6; all pages.
The Auto Channel webpage, Daewoo to Showcase 3DVUs Visual Map Navigation Technology; all pages.
Navi2Go brochure; all pages.
Printout of YouTube webpage, Navi2Go in Action, dated Jul. 27, 2007; all pages.
Transcript of Aug. 5, 2016 Deposition of Dr. William Michalson; all pages.
Tech Node webpage, Navi2Go 3D Image Navigation System on Mobile Phone, dated Dec. 3, 2008; all pages.
CNET webpage, 3DVU announces Way2Go 3D mobile mapping, dated Jan. 8, 2009; all pages.
Directions of Magazine webpage, 3DVU Releases the Ultimate Game-Changer in Mobile Navigation; all pages.
Directions Magazine webpage, 3DVU Enhancing Over 80 Million Nokia Phones With Navi2Go; all pages.
Directions Magazine webpage, 3DVUs Mobile Navigation Best Seller on Sprints Shop, dated Jun. 20, 2008; all pages.
VC Caf webpage, Navi2Go: the Ultimate Killer Navigation Application; all pages.
Brochure Kenwood Car Navigation System, HDX-700, HDZ-2570iTS, HDZ-2500iS (2002); all pages.
Brochure Kenwood Car Navigation System, HDV-910, HDV-810, HDX-710, HDZ-2510iS (2004); all pages.
Brochure Kenwood Car Navigation System, HDV-910, HDV-810 (2004); all pages.
Berry Review webpage, 3D GPS Navigation on Your BlackBerry, dated Jul. 8, 2008; all pages.
GPS Business News webpage, 3DVU signed up with Orange UK for off-board nav solution, dated Apr. 11, 2008; all pages.
FlyOver trademark application prosecution history with Specimen; all pages.
Sourceforge webpage, TerraVision; all pages.
Sourceforge webpage, TerraVision Open Sourced, dated Nov. 1, 2002; all pages.
Bing Map Tile System, Bing Maps Articles; all pages.
Declaration of Olena Ierega; all pages.
PRweb webpage, 3DVU and Infoterra Signed a Memorandum of Understanding, dated Sep. 15, 2005; all pages.
Declaration of Inventors pursuant to 37 C.F.R. 1.131 with Exhibits, in U.S. Pat. No. 7,644,131, dated Sep. 24, 2005; all pages.
Declaration of Inventors pursuant to 37 C.F.R. 1.131 with Exhibits, in U.S. Pat. No. 7,644,131; all pages.
Visualization System for SRIs Digital Earth Proposal, dated Apr. 16, 1999; all pages.
George Strawn, Next Generation Internet (NGI) Initiative; all pages.
Declaration of Yonatan Lavi, Exhibit 1017 with exhibits (attachments) A-E filed in PTAB Case No. IPR2016-00448, all pages.

\* cited by examiner

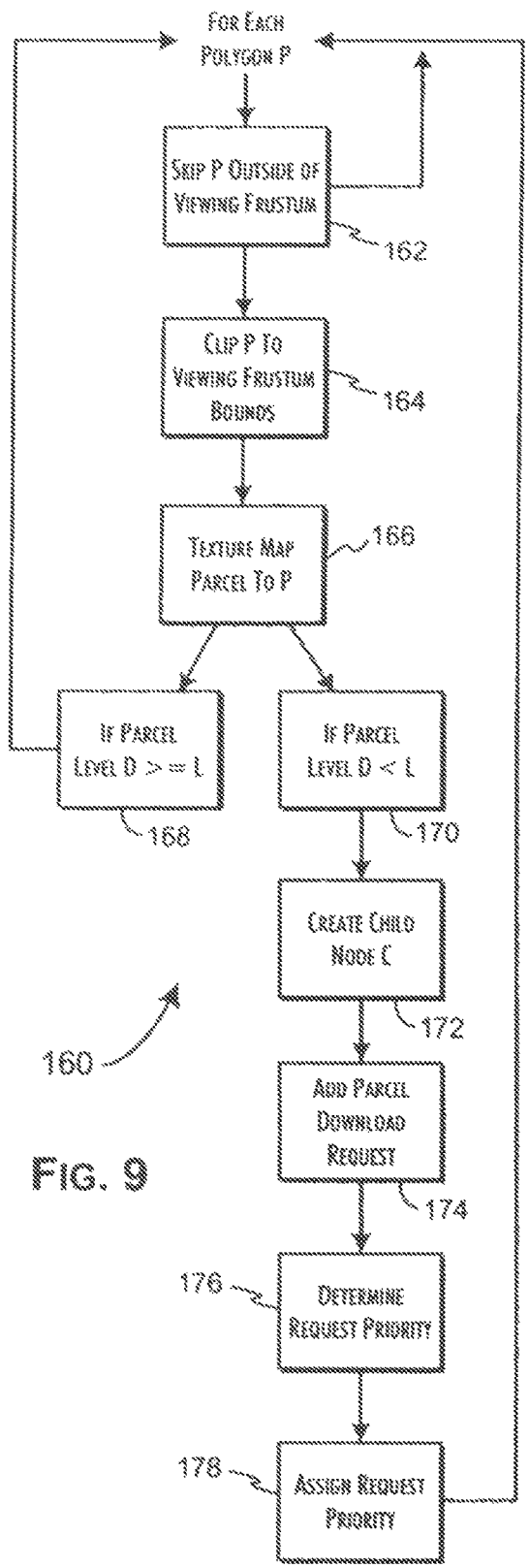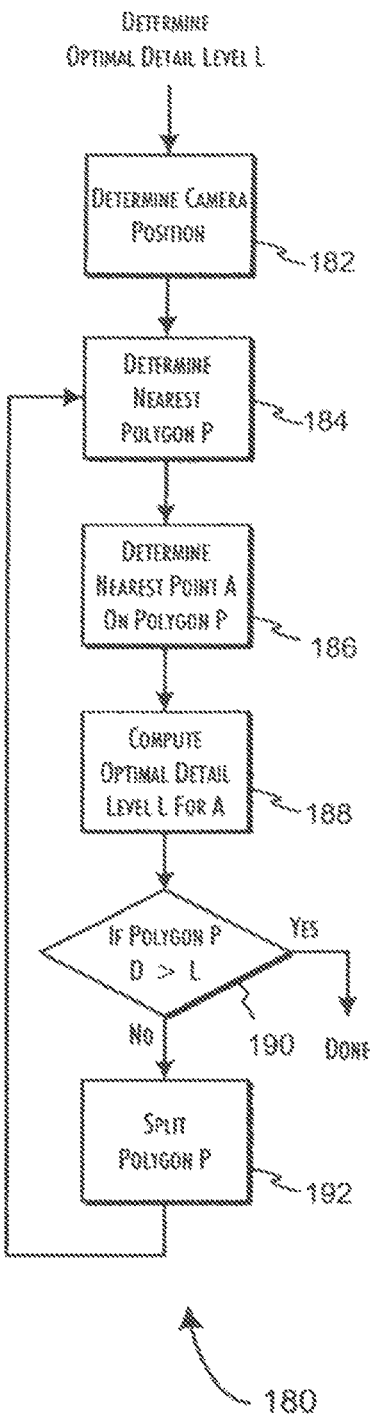
Fig. 9
Fig. 10

OPTIMIZED IMAGE DELIVERY OVER LIMITED BANDWIDTH COMMUNICATION CHANNELS

PRIORITY CLAIMS/RELATED APPLICATIONS

This application is a continuation of and claims priority to U.S. patent application Ser. No. 14/547,148, filed Nov. 19, 2014, entitled OPTIMIZED IMAGE DELIVERY OVER LIMITED BANDWIDTH COMMUNICATION CHANNELS, now U.S. Pat. No. 9,253,239; which is a continuation of and claims priority to U.S. patent application Ser. No. 13/027,929, filed Feb. 15, 2011, entitled OPTIMIZED IMAGE DELIVERY OVER LIMITED BANDWIDTH COMMUNICATION CHANNELS, now U.S. Pat. No. 8,924,506; which is a continuation-in-part of and claims priority to U.S. patent application Ser. No. 12/619,643, filed on Nov. 16, 2009, entitled OPTIMIZED IMAGE DELIVERY OVER LIMITED BANDWIDTH COMMUNICATION CHANNELS, now U.S. Pat. No. 7,908,343; which is a continuation of and claims priority to U.S. patent application Ser. No. 10/035,987, filed on Dec. 24, 2001, entitled OPTIMIZED IMAGE DELIVERY OVER LIMITED BANDWIDTH COMMUNICATION CHANNELS, now U.S. Pat. No. 7,644,131; which claims the benefit under 35 U.S.C. §119(e) of U.S. Provisional Application Nos. 60/258,488, 60/258,489, 60/258,465, 60/258,468, 60/258,466, and 60/258,467, all filed Dec. 27, 2000. The disclosures of all of the foregoing patent documents are incorporated herein by reference as if fully set forth herein, including Figures, Claims, and Tables. The present application is also related to U.S. patent application Ser. No. 10/035,981, filed on Dec. 24, 2001, entitled SYSTEM AND METHODS FOR NETWORK IMAGE DELIVERY WITH DYNAMIC VIEWING FRUSTUM OPTIMIZED FOR LIMITED BANDWIDTH COMMUNICATION CHANNELS, Levanon et al., now U.S. Pat. No. 7,139,794, issued on Nov. 21, 2006 and which is assigned to the Assignee of the present Application.

FIELD

The disclosure is related to network based, image distribution systems and, in particular, to a system and methods for efficiently selecting and distributing image parcels through a narrowband or otherwise limited bandwidth communications channel to support presentation of high-resolution images subject to dynamic viewing frustums.

BACKGROUND

The Internet and or other network systems may provide a unique opportunity to transmit for example complex images, typically large scale bit-maps, particularly those approaching photo-realistic levels, over large area and or distances. In common application, the images may be geographic, topographic, and or other highly detailed maps. The data storage requirements and often proprietary nature of such images could be such that conventional interests may be to transfer the images on an as-needed basis.

In conventional fixed-site applications, the image data may be transferred over a relatively high-bandwidth network to client computer systems that in turn, may render the image. Client systems may typically implement a local image navigation system to provide zoom and or pan functions based on user interaction. As well recognized problem with such conventional systems could be that full resolution image presentation may be subject to the inherent transfer latency of the network. Different conventional systems have been proposed to reduce the latency affect by transmitting the image in highly compressed formats that support progressive resolution build-up of the image within the current client field of view. Using a transform compressed image transfer function increases the field of the image that can be transferred over a fixed bandwidth network in unit time. Progressive image resolution transmission, typically using a differential resolution method, permits an approximate image to be quickly presented with image details being continuously added over time.

Tzou, in U.S. Pat. No. 4,698,689, describes a two-dimensional data transform system that supports transmission of differential coefficients to represent an image. Subsequent transmitted coefficient sets are progressively accumulated with prior transmitted sets to provide a succeedingly refined image. The inverse-transform function performed by the client computer is, however, highly compute intensive. In order to simplify the transform implementation and further reduce the latency of presenting any portion of an approximate image, images are subdivided into a regular array. This enables the inverse-transform function on the client, which is time-critical, to deal with substantially smaller coefficient data sets. The array size in Tzou is fixed, which leads to progressively larger coefficient data sets as the detail level of the image increases. Consequently, there is an inherently increasing latency in resolving finer levels of detail.

An image visualization system proposed by Yap et al., U.S. Pat. No. 6,182,114, overcomes some of the foregoing problems. The Yap et al. system also employs a progressive encoding transform to compress the image transfer stream. The transform also operates on a subdivided image, but the division is indexed to the encoding level of the transform. The encoded transform coefficient data sets are, therefore, of constant size, which supports a modest improvement in the algorithmic performance of the inverse transform operation required on the client.

Yap et al. adds utilization of client image panning or other image pointing input information to support a foveation-based operator to influence the retrieval order of the subdivided image blocks. This two-dimensional navigation information is used to identify a foveal region that is presumed to be the gaze point of a client system user. The foveation operator defines the corresponding image block as the center point of an ordered retrieval of coefficient sets representing a variable resolution image. The gaze point image block represents the area of highest image resolution, with resolution reduction as a function of distance from the gaze point determined by the foveation operator. This technique thus progressively builds image resolution at the gaze point and succeedingly outward based on a relatively compute intensive function. Shifts in the gaze point can be responded to with relative speed by preferentially retrieving coefficient sets at and near the new foveal region.

Significant problems remain in permitting the convenient and effective use of complex images by many different types of client systems, even with the improvements provided by the various conventional systems. In particular, the implementation of conventional image visualization systems is generally unworkable for smaller, often dedicated or embedded, clients where use of image visualization would clearly be beneficial. Conventional approaches effectively presume that client systems have an excess of computing performance, memory and storage. Small clients, however, typically have restricted performance processors with possibly no dedicated floating-point support, little general purpose memory, and extremely limited persistent storage capabilities, particularly relative to common image sizes. A mobile computing device such as mobile phone, smart phone, tablet and or personal digital assistant (PDA) is a characteristic small client. Embedded, low-cost kiosk, automobile navigation systems and or Internet enabled I connected TV are other typical examples. Such systems are not readily capable, if at all, of performing complex, compute-intensive Fourier or wavelet transforms, particularly within a highly restricted memory address space.

As a consequence of the presumption that the client is a substantial computing system, conventional image visualization systems also presume that the client is supported by a complete operating system. Indeed, many expect and require an extensive set of graphics abstraction layers to be provided by the client system to support the presentation of the delivered image data. In general, these abstraction layers are conventionally considered required to handle the mapping of the image data resolution to the display resolution capabilities of the client system. That is, resolution resolved image data provided to the client is unconstrained by any limitation in the client system to actually display the corresponding image. Consequently, substantial processor performance and memory can be conventionally devoted to handling image data that is not or cannot be displayed.

Another problem is that small clients are generally constrained to generally to very limited network bandwidths, particularly when operating under wireless conditions. Such limited bandwidth conditions may exist due to either the direct technological constraints dictated by the use of a low bandwidth data channel or indirect constraints imposed on relatively high-bandwidth channels by high concurrent user loads. Cellular connected PDAs and webphones are examples of small clients that are frequently constrained by limited bandwidth conditions. The conventionally realizable maximum network transmission bandwidth for such small devices may range from below one kilobit per second to several tens of kilobits per second. While Yap et al. states that the described system can work over low bandwidth lines, little more than utilizing wavelet-based data compression is advanced as permitting effective operation at low communications bandwidths. While reducing the amount of data that must be carried from the server to the client is significant, Yap et al. simply relies on the data packet transfer protocols to provide for an efficient transfer of the compressed image data. Reliable transport protocols, however, merely mask packet losses and the resultant, sometimes extended recovery latencies. When such covered errors occur, however, the aggregate bandwidth of the connection is reduced and the client system can stall waiting for further image data to process.

Consequently, there remains a need for an image visualization system that can support small client systems, place few requirements on the supporting client hardware and software resources, and efficiently utilize low to very low bandwidth network connections.

SUMMARY

Thus, a general purpose of the present invention is to provide an efficient system and methods of optimally presenting image data on client systems with potentially limited processing performance, resources, and communications bandwidth.

This is achieved in the present invention by providing for the retrieval of large-scale images over network communications channels for display on a client device by selecting an update image parcel relative to an operator controlled image viewpoint to display via the client device. A request is prepared for the update image parcel and associated with a request queue for subsequent issuance over a communications channel. The update image parcel is received from the communications channel and displayed as a discrete portion of the predetermined image. The update image parcel optimally has a fixed pixel array size, is received in a single and or plurality of network data packets, and were the fixed pixel array may be constrained to a resolution less than or equal to the resolution of the client device display.

An advantage of the present invention is that both image parcel data requests and the rendering of image data are optimized to address the display based on the display resolution of the client system.

Another advantage of the present invention is that the prioritization of image parcel requests is based on an adaptable parameter that minimizes the computational complexity of determining request prioritization and, in turn, the progressive improvement in display resolution within the field of view presented on a client display.

A further advantage of the present invention is that the client software system requires relatively minimal client processing power and storage capacity. Compute intensive numerical calculations are minimally required and image parcel data is compactly stored in efficient data structures. The client software system is very small and easily downloaded to conventional computer systems or embedded in conventional dedicated function devices, including portable devices, such as PDAs, tablets and webphones.

Still another advantage of the present invention is that image parcel data requests and presentation can be readily optimized to use low to very low bandwidth network connections. The software system of the present invention provides for re-prioritization of image parcel data requests and presentation in circumstances where the rate of point-of-view navigation exceeds the data request rate.

Yet another advantage of the present invention is that image parcel data rendering is performed without requiring any complex underlying hardware or software display subsystem. The client software system of the present invention includes a bit-map rendering engine that draws directly to the video memory of the display, thus placing minimal requirements on any underlying embedded or disk operating system and display drivers. Complex graphics and animation abstraction layers are not required.

Still another advantage of the present invention is that image parcel block compression is used to obtain fixed size transmission data blocks. Image parcel data is recoverable from transmission data using a relatively simple client decompression algorithm. Using fixed size transmission data blocks enables image data parcels to be delivered to the client in bounded time frames.

A yet further advantage of the present invention is that multiple data forms can be transferred to the client software system for concurrent display. Array overlay data, correlated positionally to the image parcel data and generally insensitive to image parcel resolution, can be initially or progressively provided to the client for parsing and parallel presentation on a client display image view.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein:

FIG. 9 provides a process flow diagram detailing the rendering and progressive prioritization of image parcel data download requests in accordance with a preferred embodiment of the present invention; and FIG. 10 provides a process flow diagram detailing the determination of an optimal detail level for image parcel presentation for a current viewing frustum in accordance with a preferred embodiment of the present invention.

DETAILED DESCRIPTION OF ONE OR MORE EMBODIMENTS

Figure 1:
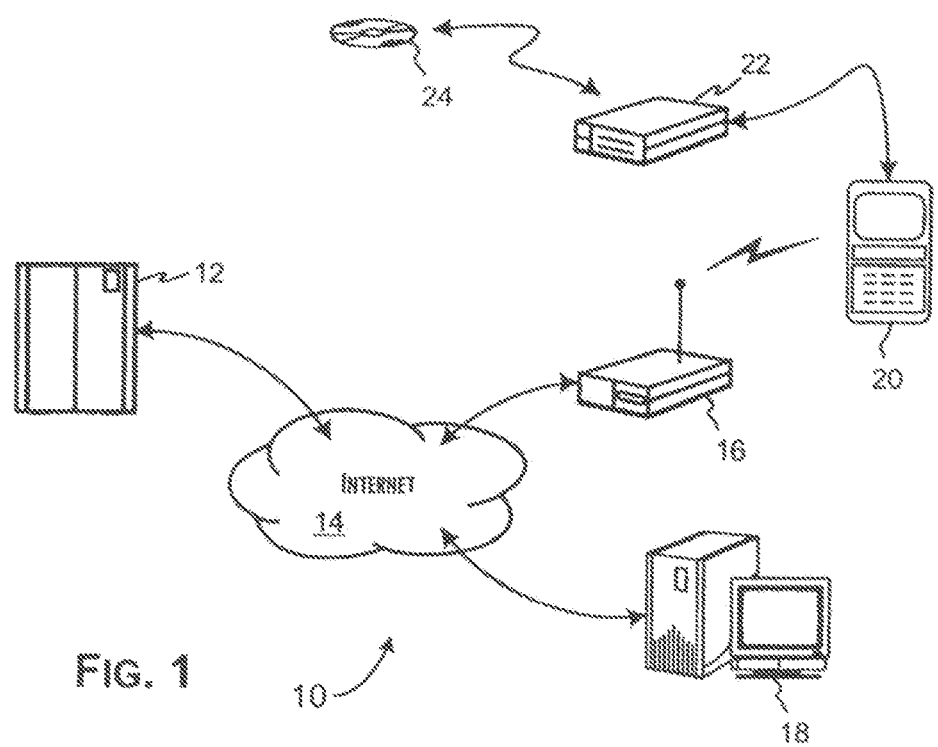
FIG. 1 depicts a preferred system environment within which various embodiments of the present invention can be utilized.

The preferred operational environment 10 of the present invention is generally shown in FIG. 1. A network server system 12, operating as a data store and server of image data, is responsive to requests received through a communications network, such as the Internet 14 generally and various tiers of internet service providers (ISPs) including a wireless connectivity provider 16. Client systems, including conventional workstations and personal computers 18 and smaller, typically dedicated function devices often linked through wireless network connections, such as PDAs, webphones 20, and automobile navigation systems, source image requests to the network server 12, provide a client display and enable image navigational input by a user of the client system. Alternately, a dedicated function client system 20 may be connected through a separate or plug-in local network server 22, preferably implementing a small, embedded Web server, to a fixed or removable storage local image repository 24. Characteristically, the client system 18, 20 displays are operated at some fixed resolution generally dependent on the underlying display hardware of the client systems 18, 20.

The image navigation capability supported by the present invention encompasses a viewing frustum placed within a three-dimensional space over the imaged displayed on the client 18, 20. Client user navigational inputs are supported to control the x, y lateral, rotational and z height positioning of the viewing frustum over the image as well as the camera angle of incidence relative to the plane of the image. To effect these controls, the software implemented on the client systems 18, 20 supports a three-dimensional transform of the image data provided from the server 12, 22.

Figure 2:
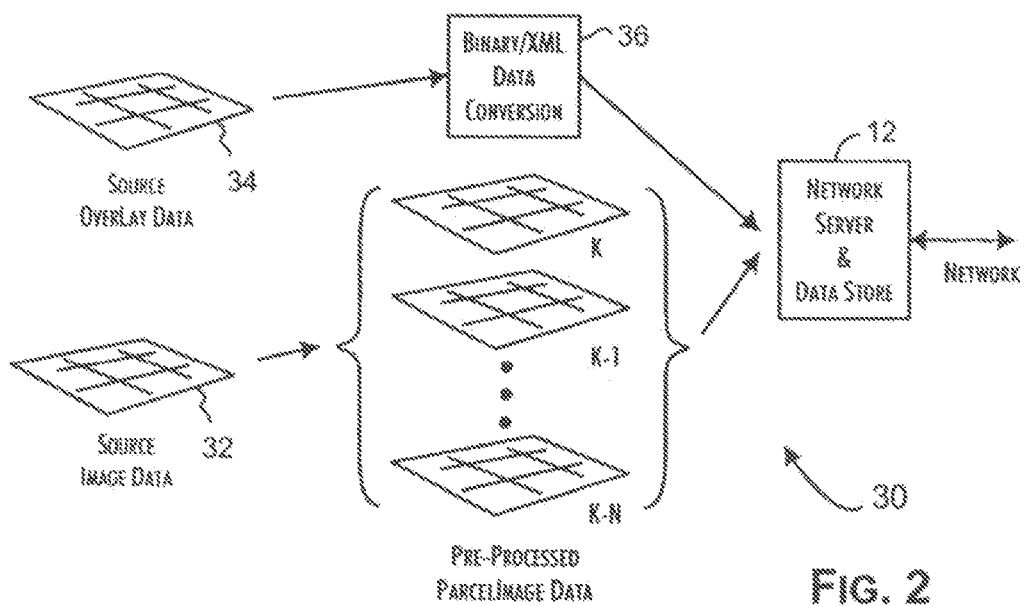
FIG. 2 is a block diagram illustrating the preparation of image parcel and overlay data set that are to be stored by and served from a network server system in accordance with a preferred embodiment of the present invention.

In accordance with the preferred embodiments of the present invention, as generally illustrated in FIG. 2, a network image server system 30 stores a combination of source image data 32 and source overlay data 34. The source image data 32 is typically high-resolution bit-map raster map and or satellite imagery of geographic regions, which can be obtained from commercial suppliers. The overlay image data 34 is typically a discrete data file providing image annotation information at defined coordinates relative to the source image data 32. In the preferred embodiments of the present invention, image annotations include, for example, street, building and landmark names, as well as representative 2 and 3D objects, graphical icons, decals, line segments, and or text and or other characters, graphics and or other media.

The network image server system 30 preferably pre-processes the source image data 32 and or source overlay data 34 to forms preferred for storage and serving by the network server 12, 22. The source image data 32 is preferably pre-processed to obtain a series $K_{1-N}$ of derivative images of progressively lower image resolution. The source image data 32, corresponding to the series image $K_O$, is also subdivided into a regular array such that each resulting image parcel of the array has for example a 64 by 64 pixel resolution where the image data has a color or bit per pixel depth of 16 bits, which represents a data parcel size of 8K bytes. The resolution of the series $K_{1-N}$ of derivative images is preferably related to that of the source image data 32 or predecessor image in the series by a factor of four. The array subdivision is likewise related by a factor of four such that each image parcel is of a fixed 8K byte size.

In the preferred embodiment of the present invention, the image parcels are further compressed and stored by the network server 12, 22. The preferred compression algorithm may implements for example a fixed 4:1 compression ratio such that each compressed and stored image parcel has a fixed 2K byte size. The image parcels are preferably stored in a file of defined configuration such that any image parcel can be located by specification of a $K_D$, X, Y value, representing the image set resolution index D and corresponding image array coordinate.

In other implementations, the image array dimensions (which as 64×64 above) may be powers of two so that the image array can be used in texture mapping efficiently. To accommodate different data parcel size than the 2 KByte associated with 64×64 pixel parcel dimension described above and other communication protocol and overhead requirements, to accommodate transmission through other than a 3 KByte per second transmission channel, the present invention may use larger compression ratios that takes, for example, a 128×128 or 256×256 pixel parcel dimension and compresses it to meet the 3 KByte per second transmission channel, or other communication bandwidth used to stream the parcel.

The system may also accommodate different and larger data parcel sizes as transmission protocols, compression ratio achieved and micro-architectures of the client computers change. For purposes above, the data content was a pixel array representing image data. Where the data parcel content is vector, text or other data that may subject to different client system design factors, other parcel sizes may be used. Furthermore, the parcel sizes can be different between the server and the client. For example the server may create parcels or hold parcels, for streaming with 256×256 pixel parcel dimension and the client my render them as 64×64. In addition, parcels sizes on different servers may vary from one server to another and from the client side rendering. In the system, each grid is treated as a sparse data array that can be progressively revised to increase the resolution of the grid and thereby the level of detail presented by the grid.

The source overlay data 34 is preferably pre-processed 36 into either an open XML format, such as the Geography Markup Language (GML), which is an XML based encoding standard for geographic information developed by the OpenGIS Consortium (OGC; www.opengis.org), or a proprietary binary representation. The XML/GML representation is preferred as permitting easier interchange between different commercial entities, while the binary representation is preferred as more compact and readily transferable to a client system 18, 20. In both cases, the source overlay data 34 is pre-processed to contain the annotation data preferably in a resolution independent form associated with a display coordinate specification relative to the source image data 32. The XML, GML or binary overlay data may be compressed prior to storage on the network server 12, 22.

Figure 3:
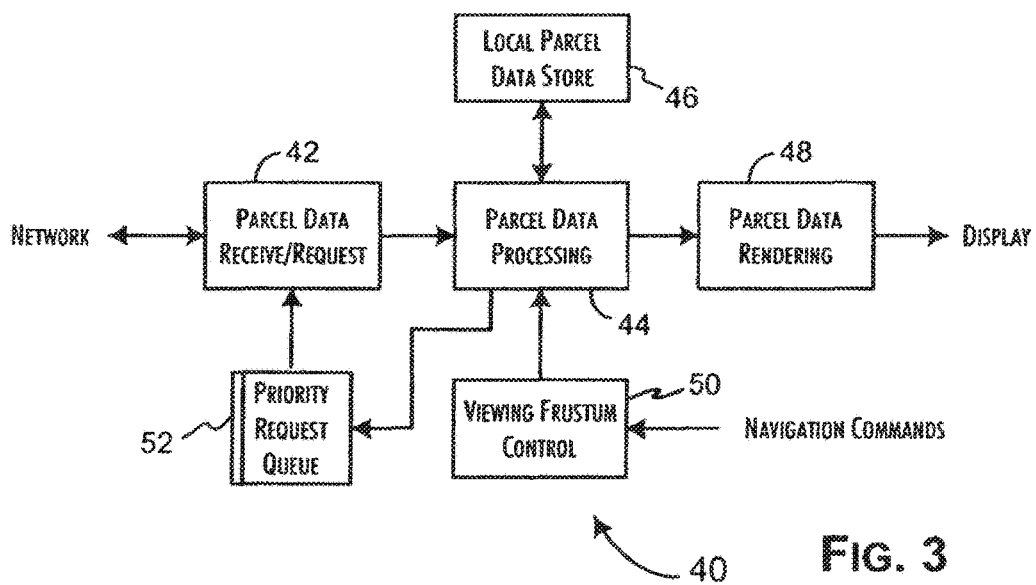
FIG. 3 is a block diagram of a client system image presentation system constructed in accordance with a preferred embodiment of the present invention.

The preferred architecture 40 of a client system 18, 20, for purposes of implementing the present invention, is shown in FIG. 3. The architecture 40 is preferably implemented by software plug-in or application executed by the client system 18, 20 and that utilizes basic software and hardware services provided by the client system 18, 20. A parcel request client 42 preferably implements an HTML client that supports HTML-based interactions with the server 12, 22 using the underlying network protocol stack and hardware network interface provided by the client systems 18, 20. A central parcel processing control block 44 preferably implements the client process and control algorithms. The control block 44 directs the transfer of received image parcels and XML/GML/binary overlay data to a local parcel data store 46. Local parcel data store 46 may also act for example as local cache weather the entire data or part of it is in dynamic and/or static cache. Preferably image data parcels are stored in conventional quad-tree data structures, where tree nodes of depth D correspond to the stored image parcels of a derivative image of resolution KD. The XML/GML/binary overlay data is preferably stored as a data object that can be subsequently read by an XML/GML/binary parser implemented as part of the control block 44.

The control block 44 is also responsible for decompressing and directing the rendering of image parcels to a local display by a rendering engine 48. Preferably, the rendering engine 48 writes to the video memory of the underlying client display hardware relying on only generic graphics acceleration hardware capabilities and may take advantage of more advanced graphics acceleration hardware when available in the client system 18, 20. In general, the relied on capabilities include bit-bit and related bit-oriented functions that are readily supported by current conventional display controller hardware. The rendering engine 48 is optimized to perform image parcel texture mapping without reliance on complex floating point operations, permitting even relatively simple processors to efficiently execute the rendering engine 48. The rendering engine 48 may take advantage of floating point operations when available in the client system 18, 20.

Changes in the viewing frustum are determined from user input navigation commands by a frustum navigation block 50. In the preferred embodiments of the present invention, the input navigation controls are modeled for three-dimensional fly-over navigation of the displayed image. The navigation controls support point-of-view rotation, translation, attitude, and altitude over the displayed image. The effective change in viewing frustum as determined by the frustum navigation block 50 is provided to the control block 44.

The control block 44, based in part on changes in the viewing frustum, determines the ordered priority of image parcels to be requested from the server 12, 22 to support the progressive rendering of the displayed image. The image parcel requests are placed in a request queue 52 for issuance by the parcel request client 42. Preferably, the pending requests are issued in priority order, thereby dynamically reflecting changes in the viewing frustum with minimum latency.

In various implementations of the parcel processing, each data parcel is independently processable by the client system 18, 20, which is enabled by the selection and server-side processing used to prepare a parcel for transmission, thus providing for on-demand real-time parcel processing and creation on the server side for streaming based on the client request and not only for pre-processed parcel creation for retrieval for streaming from the server. Thus, the system can use both pre-processed parcels on the server and on-demand real-time creation of such parcels on the server side for streaming to the client.

Figure 4:
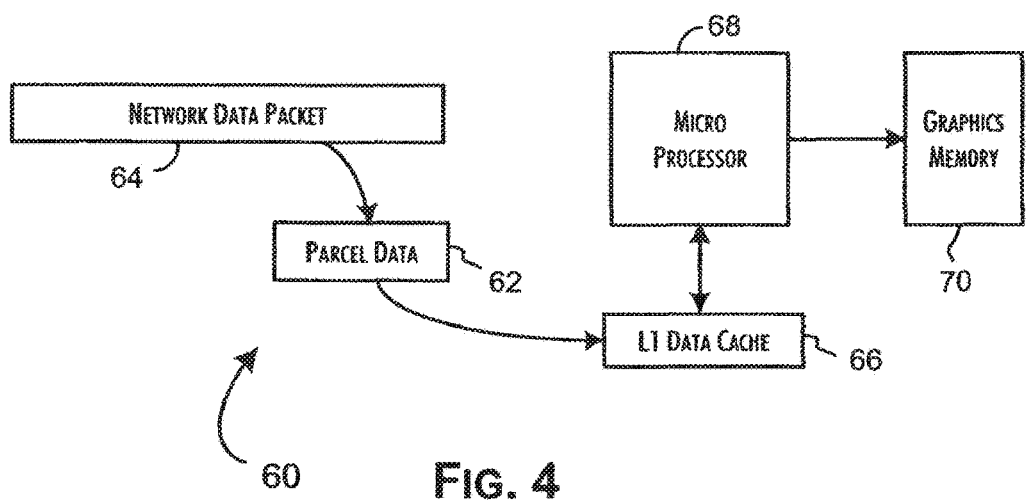
FIG. 4 provides a data block diagram illustrating an optimized client image block processing path constructed in accordance with a preferred embodiment of the present invention.

An optimal image parcel data flow 60, as configured for use in the preferred embodiments of the present invention, is shown in FIG. 4. Preferably, the TCP/IP network protocol is used to deliver image parcels to the clients 18, 20. For the preferred embodiments, where network bandwidth is limited or very limited, entire image parcels are preferably delivered in corresponding data packets. This preference maximizes data delivery while avoiding the substantial latency and processing overhead of managing image parcel data split over multiple network packets. Thus, a 2K byte compressed image parcel 62 is delivered as the data payload of a TCP/IP packet 64. Uncompressed, the 8K byte image parcel 62 is recognized as part of the present invention as being within the nominally smallest LI data cache 66 size of conventional microprocessors 68. By ensuring that an uncompressed image parcel fits within the LI cache, the texture map rendering algorithm can execute with minimum memory management overhead, thus optimally utilizing the processing capability of the microprocessor 68. Additionally, the writing of video data as a product of the rendering algorithm is uniform, thereby improving the apparent video stability of the display to the user.

Figure 5:
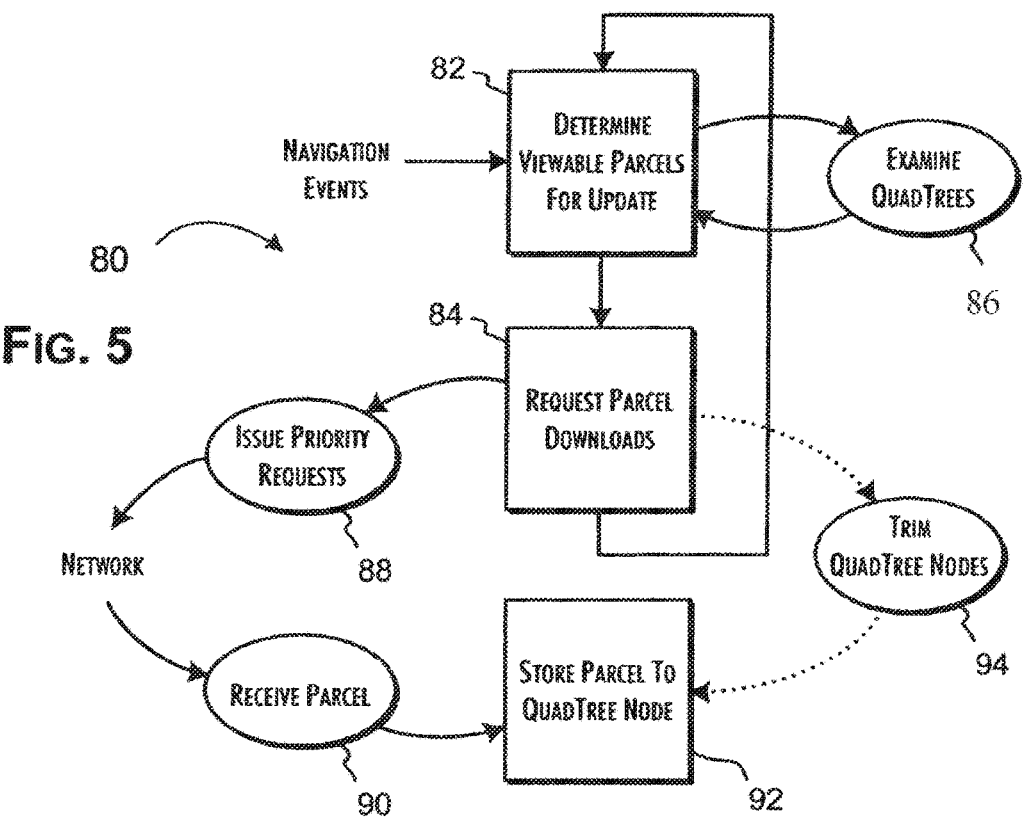
FIG. 5 is a process flow diagram showing a main processing thread implemented in a preferred embodiment of the present invention.

The client architecture 40 preferably executes in multiple process threads, with additional threads being utilized for individual network data request transactions. As shown in FIG. 5, an image parcel management process 80 implements a loop that determines image parcels subject to update 82 and creates corresponding image parcel download requests 84. Navigation events that alter the viewing frustum are considered in part to determine the current field of view. The quad tree data structures are examined 86 to identify viewable image parcels of higher resolution than currently available in the parcel data store 46.

A pool of image request threads is preferably utilized to manage the image parcel download operations. In the preferred embodiments of the present invention, a pool of four network request threads is utilized. The number of pool threads is determined as a balance between the available system resources and the network response latency, given the available bandwidth of the network connection. Empirically, for many wireless devices, four concurrent threads are able to support a relatively continuous delivery of image data parcels to the client 20 for display processing. As image parcels are progressively identified for download, a free request thread is employed to issue 88 a corresponding network request to the server 12, 22. When a network response is received, the corresponding thread recovers 90 the image parcel data. The received image parcel is then stored 92 in a corresponding quad-tree data structure node.

For small clients 20, the available memory for the parcel data store 46 is generally quite restricted. In order to make optimal use of the available memory, only currently viewable image parcels are subject to download. Where the size of the parcel data store 46 is not so restricted, this constraint can be relaxed. In either case, a memory management process 94 runs to monitor use of the parcel data store 46 and selectively remove image parcels to free memory for newly requested image parcels. Preferably, the memory management process 94 operates to preferentially remove image parcels that are the furthest from the current viewing frustum and that have the highest data structure depth. Preferably child node image parcels are always removed before a parent node parcel is removed.

Figure 6:
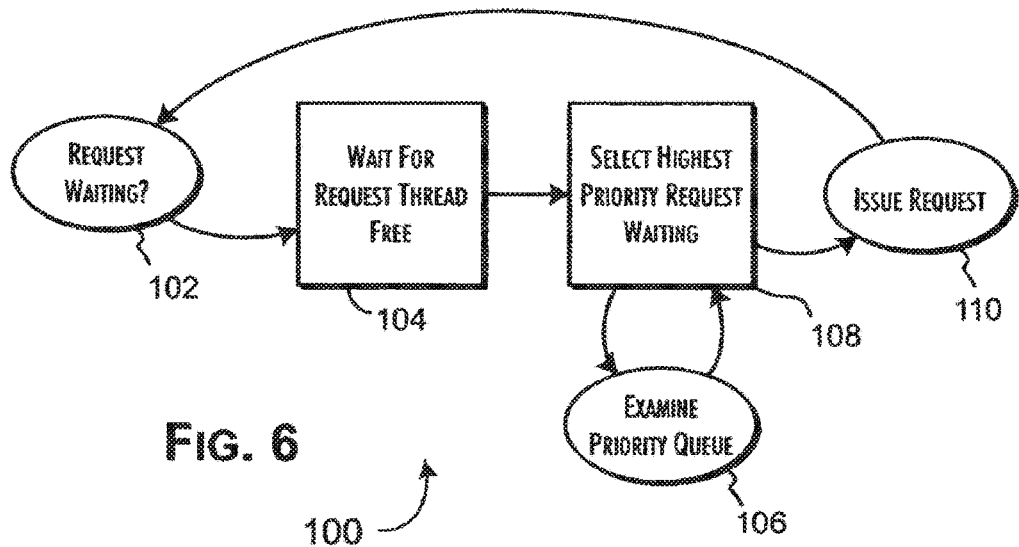
FIG. 6 provides a process flow diagram showing a network request thread implemented in a preferred embodiment of the present invention.

A preferred network request management process 100 is shown in FIG. 6. The process 100 waits 102 on the existence of a download request in the priority request queue 52. The process 100 then waits on a network request pool thread to become free 104. When a network request thread becomes available, the process 100 examines 106 all of the pending requests in the priority request queue 52 and selects 108 the request with the highest assigned priority. Thus, sequentially enqueued requests can be selectively issued out of order based on an independently assigned request priority. The request is then issued 110 and the request management process 100 leaves the request thread waiting on a network response.

Figure 7:
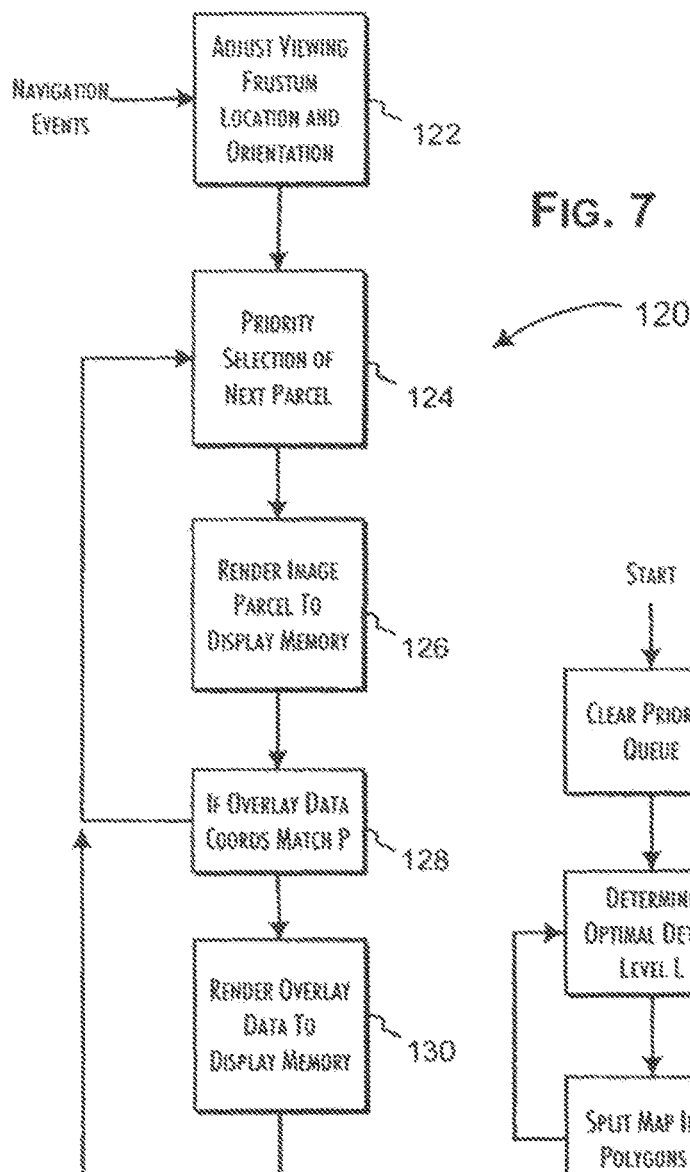
FIG. 7 provides a process flow diagram showing a display image rendering thread implemented in a preferred embodiment of the present invention.

FIG. 7 presents a preferred display management process 120. Event driven user navigation information is evaluated 122 to determine a current viewing frustum location and orientation within a three-dimensional space relative to the displayed image. An algorithmic priority selection 124 of a next image parcel to render is then performed. The selected image parcel is then rendered 126 to the display memory 70. The rendering operation preferably performs a texture map transform of the parcel data corresponding to the current viewing frustum location and orientation. The overlay data is then parsed or is pre-parsed to determine 128 whether the image coordinates of any overlay annotation correspond to the current image parcel location. If the coordinates match, the overlay annotation is rendered 130 to the video display memory 70. The process 120 then continues with the next selection 124 of an image parcel to render, subject to any change in the viewing frustum location and orientation.

Figure 8:
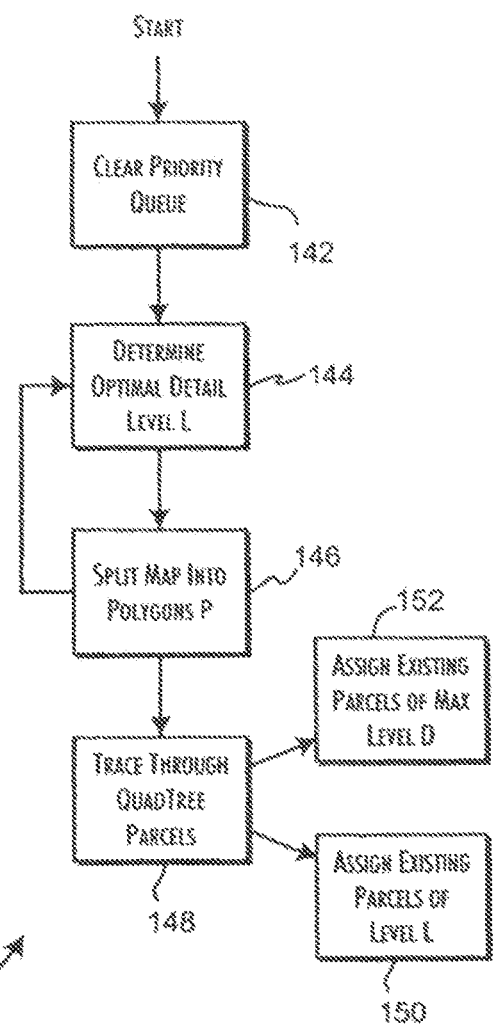
FIG. 8 provides a process flow diagram showing the parcel map processing performed preliminary to the rendering of image data parcels in accordance with a preferred embodiment of the present invention.

A preferred implementation of the selection 124 and rendering 126 of image parcels in accordance with the present invention is detailed in FIGS. 8 through 10. Referring first to FIG. 8, any outstanding requests in the priority request queue 52 are preferably cleared 142 in response to a change in the viewing frustum location and orientation. The effective altitude of the viewing frustum and or the resolution of the client display are then used as a basis for determining an optimal level of detail L that will be displayed. The detail level L value operates as a floor defining the maximum resolution $K_L$ of image data that can be effectively viewed on the client display given the location and or orientation of the viewing frustum. Constraining image parcel requests to the resolution range $K_N$ to $K_L$, where $K_N$ is the lowest resolution derivative image stored by the network server 12, 22, prevents the download and processing of image parcels that cannot provide any perceptible improvement in the displayed image.

As part of the recursive evaluation of the optimal level of detail L, the image display space is progressively split 146 by four to one reductions into polygons. The quad-tree data structures holding existing image parcel data in the parcel data store 46 are concurrently traced 148 to establish a correspondence with the polygon map. Where the trace of a quad-tree data structure completes 150 to a node index of L for a polygon P, the node corresponding image parcel is associated with polygon P. The polygon P will not be further subdivided and no higher resolution image parcels will be requested for any portion of the image within the area represented by polygon P. Where the trace reaches a maximum node index of D for a polygon P' 152, where N.ltoreq.D<L and N is the index of the lowest resolution derivative image stored by the network server 12, 22, the image parcel associated with the node is associated with the polygon P'. This polygon P' will be subject to further subdivision and progressive requests for image parcels of higher resolution up to the detail level L.

Referring now to FIG. 9, a display image is then rendered 160 beginning with the maximum depth polygons previously found. Iterating over the set of maximum depth polygons, any polygons outside of the viewing frustum are skipped 162. Polygons that are at least partially visible are clipped to the applicable bounds of the viewing frustum 164. The polygon corresponding image parcel data is then texture mapped 166 into the polygon corresponding coordinates of the video memory 70. If the node index depth of the rendered image parcel is at least equal to the prior determined optimal detail level L 168, the iteration over the polygons P continues.

Where the node index depth is less than the optimal detail level L 170, the polygon P' is subdivided into four polygons and correspondingly represented by the creation of four child nodes within the associated quad-tree data structure 172. Four image parcel download requests are then created 174.

The download priority associated with each request is determined 176 by execution of a function S that operates on a 2D polygon argument P and returns a real number representing the request priority. The function argument P is a list of real (x, y) coordinates of the vertices of the current polygon in screen coordinates after being clipped to fit within the current viewing frustum. That is, the function S works over general polygons in a two-dimensional space, whose vertices are specified by the series $\{(x(1),y(1)), (x(2),y(2)), \ldots, (x(n),y(n))\}$. The argument P vertices sent to S represent the position of the vertices composing each of the polygons, after being clipping to the viewing frustum, viewable within the display space having the fixed resolution [xRes, yRes]. Thus, the clipped polygons are all within the rectangle [O, xRes]×[O, yRes].

In execution of the function S, each of the P coordinates is first transformed by linear mapping of the screen coordinate space to the square $[-1,1] \times [-1,1]$ by the operation $x(i):=(x(i)-xRes/2)/(xRes/2)$; $y(i)=(y(i)-yRes/2)/(yRes/2)$. The x and y coordinate values of each vertex $(x(i),y(i))$ for i=1 to n) are then transformed by the function $T(a)=sgn(a)*pow(|a|, d)$, where the control parameter d is a constant in the range (0,1], or equivalently the interval $O<d.ltoreq.1$. The function S then returns a real value that is equal to the area covered by the argument polygon P vertices subject to the applied coordinate transformation. Thus, the accumulated priority for any image parcel pending download is the sum of the values of returned by the function S for each of the viewable polygons that require some part of the image parcel as the source data for texture map rendering of the polygon. The priority operation of the request queue 52 is such that download requests will be issued preferentially for image parcels with the largest priority value.

In accordance with the preferred embodiments of the present invention, the value of the control parameter d can be adjusted to ultimately affect the behavior of the function S in determining the download request priority. In general, image parcels with lower resolution levels will accumulate greater priority values due to the larger number of polygons that may use a given low resolution image parcel as a rendering data source. Such lower resolution image parcels are therefore more likely to be preferentially downloaded. In accordance with the present invention, this generally assures that a complete image of at least low resolution will be available for rendering.

The control parameter d, as applied in execution of the function S, well as the area distortion produced by the projection transform also influences the value returned by the function S such that relatively higher-resolution image parcels near the image view point will occasionally achieve a higher priority than relatively remote and partially viewed image parcels of lower resolution. Using values smaller than 1 for the control parameter d results in requests with a higher priority for parcels covering areas near the focal point of the viewer, which is presumed to be the center point of the display space, relative to requests for parcels further from the center point in absolute terms and of the same resolution depth D. Thus, in accordance with the present invention, the priority assigned to image parcel requests effectively influences the order of requests based on the relative contribution of the image parcel data to the total display quality of the image. Empirically, a value of 0.35 for the control parameter d for small screen devices, such as PDAs and webphones has been found to produce desirable results.

The computed priorities of each of the four newly created image parcel requests are then assigned 178 and the requests are enqueued in the priority request queue 52. The next polygon P is then considered in the loop of the image parcel rendering process 160.

The preferred algorithm 180 for determining the detail level L value for a given viewing frustum is shown in FIG. 10. In accordance with the present invention, the optimal detail level L is effectively the limit at which the resolution of image parcel data functionally exceeds the resolution of the client display. Preferably, to determine the optimal detail level L, the viewpoint or camera position of the viewing frustum is determined 182 relative to the displayed image. A nearest polygon P of depth D is then determined 184 from the effective altitude and attitude of the viewpoint. The nearest point A of the polygon P is then determined 186. The point A may be within the interior or an edge of the polygon P, though most likely be located at a vertex of the polygon P.

The optimum level of detail L at point A is then computed 188 as the base-4 logarithm of the number of pixels on the screen that would be covered by a single pixel from an image parcel of the lowest resolution K.sub.-N image, which is the quad-tree root image and corresponds to an image area covering the entire image map. The point A optimal detail level L is preferably computed analytically from the local value of the Jacobian of the projective transform used to transform the three dimensional image coordinate space to screen coordinates, evaluated at the point A.

Where the depth D of the polygon P is greater than the depth of the computed optimal level of detail L, the detail level L is taken as the optimal detail level L 190. Thus, through the process 140, an image parcel or corresponding section of the closest resolution image parcel associated with a parent node in the quad-tree data structure relative to the depth level L will be used as the texture for rendering the polygon P. Conversely, if the depth D is less than that of the optimal detail level L, the polygon P is effectively split into quadrants and the optimal level of detail is reevaluated. The process 180 thus continues iteratively until the optimal detail level L is found.

Thus, a system and methods of optimally presenting image data on client systems with potentially limited processing performance, resources, and communications bandwidth have been described. While the present invention has been described particularly with reference to the communications and display of geographic image data, the present invention is equally applicable to the efficient communications and display of other high resolution information.

In the process implemented by the system described above, data parcels may be selected for sequential transmission based on a prioritization of the importance of the data contained. The criteria for the importance of a particular data parcel may be defined as suitable for particular applications and may directly relate to the presentation of image quality, provision of a textual overlay of a low-quality image to quickly provide a navigational orientation, or the addition of topography information at a rate or timing different from the rate of image quality improvement. Thus, image data layers reflecting navigational cues, text overlays, and topography can be composed into data packets for transmission subject to prioritizations set by the server alone and not based on the client system and interactively influenced by the actions and commands provided by the user of the client system. However this also may be influenced based on the nature and type of the client system, and interactively influenced by the actions and commands provided by the user of the client system (FIG. 5).

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A method of providing images over one or more network communication channels for display on a user computing device, the method comprising steps of:
receiving at one or more servers a first request from the user computing device, over the one or more network communication channels, the first request being for a first update data parcel corresponding to a first derivative image of a predetermined image, the predetermined image corresponding to source image data, the first update data parcel uniquely forming a first discrete portion of the predetermined image, wherein the first update data parcel is selected based on a first user-controlled image viewpoint on the user computing device relative to the predetermined image;
sending the first update data parcel from the one or more servers to the user computing device over the one or more network communication channels, the step of sending the first update data parcel being performed in response to the first request;

receiving at the one or more servers a second request from the user computing device, over the one or more network communication channels, the second request being for a second update data parcel corresponding to a second derivative image of the predetermined image, the second update data parcel uniquely forming a second discrete portion of the predetermined image, wherein the second update data parcel is selected, based on a second user-controlled image viewpoint on the user computing device relative to the predetermined image, the second user-controlled image viewpoint being different from the first user-controlled image viewpoint;

sending the second update data parcel from the one or more servers to the user computing device over the one or more network communication channels, the step of sending the second update data parcel being performed in response to the second request; and processing the source image data to obtain a series of $K_{1-N}$ derivative images of progressively lower image resolution, the series of $K_{1-N}$ derivative images comprising the first derivative image and the second derivative image, wherein series image $K_0$ of the series of $K_{1-N}$ derivative images is subdivided into a regular array wherein each resulting image parcel of the array has a predetermined pixel resolution and a predetermined color or bit per pixel depth, resolution of the series $K_{1-N}$ of derivative images being related to resolution of the source image data or predecessor image in the series by a factor of two, and the array subdivision being related by a factor of two.

2. A method as in claim 1, wherein the user computing device comprises a mobile device connected to the one or more servers by the one or more network communication channels.

3. A method as in claim 2, wherein the first user-controlled image viewpoint is determined based at least in part on first navigational input of the user computing device, and the first request is prepared by a processing control block of the user computing device based at least in part on the first user-controlled image viewpoint.

4. A method as in claim 3, wherein the first request is prepared based at least in pan on altitude and attitude of the first viewpoint relative to the predetermined image.

5. A method as in claim 3, wherein the second user-controlled image viewpoint is determined based at least in part on second navigational input of the user computing device, and the second request is prepared by the processing control block of the user computing device based at least in part on the second user-controlled image viewpoint.

6. A method as in claim 5, wherein the first request is prepared based at least in part on altitude and attitude of the first viewpoint relative to the predetermined image, and the second request is prepared based at least in part on altitude and attitude of the second viewpoint relative to the predetermined image.

7. A method as in claim 6, wherein the predetermined image is an image of a geographic area.

8. A method as in claim 6, wherein the first navigational input comprises first three-dimensional coordinate position data and first rotational position data, and the second navigational input comprises second three-dimensional position data and second rotational position data.

9. A method as in claim 5, wherein the first navigational input comprises first lateral x dimension position data, first lateral y dimension position data, and first rotational position data, and the second navigational input comprises second lateral x dimension position data, second lateral y dimension position data, and second rotational position data.

10. A method as in claim 3, wherein the first update data parcel comprises first overlay data for the first derivative image.

11. A method as in claim 10, wherein the first overlay data comprises first text annotation relating to at least one item selected from the group consisting of: one or more street names, one or more building names, and one or more landmarks.

12. A method as in claim 10, wherein the first overlay data comprises graphic data representing a three-dimensional object.

13. A method as in claim 10, wherein the first overlay data comprises graphics data describing at least one object in more than two dimensions.

14. A method as in claim 10, wherein the first overlay data comprises one or more graphical icons.

15. A method as in claim 10, wherein the second update data parcel comprises second overlay data for the second derivative image.

16. A method as in claim 15, wherein the first overlay data and the second overlay data are in a resolution-independent format.

17. A method as in claim 10, wherein the first overlay data comprises first text annotation relating to at least one item selected from the group consisting of: one or more street names, one or more building names, and one or more landmarks.

18. A method as in claim 2, wherein the first derivative image includes the second derivative image, the second derivative image has a higher level of detail than the first derivative image, and the first request is received before the second request by the one or more servers.

19. A method as in claim 2, wherein the second derivative image includes the first derivative image, the second derivative image has a lower level of detail than the first derivative image, and the first request is received before the second request by the one or more servers.

20. A method as in claim 2, wherein the first derivative image does not include the second derivative image, and the second derivative image does not include the first derivative image.

21. A method as in claim 2, wherein the one or more servers comprise at least two servers.

22. A method as in claim 2, wherein each image parcel is of a fixed byte size.

23. A computing system for providing images over one or more network communication channels for display on a user mobile device, wherein the computing system comprises a processor and a memory, and wherein the computing system is configured to receive a first request from the user mobile device, over the one or more network communication channels, the first request being for a first update data parcel corresponding to a first derivative image of a predetermined image, the predetermined image corresponding to source image data, the first update data parcel uniquely forming a first discrete portion of the predetermined image, wherein the first update data parcel is selected based on a first user-controlled image viewpoint on the user mobile device relative to the predetermined image;

send the first update data parcel to the user mobile device over the one or more network communication channels, the step of sending the first update data parcel being performed in response to the first request;

receive a second request from the user mobile device, over the one or more network communication channels, the second request being for a second update data parcel corresponding to a second derivative image of the predetermined image, the second update data parcel uniquely forming a second discrete portion of the predetermined image, wherein the second update data parcel is selected based on a second user-controlled image viewpoint on the user mobile device relative to the predetermined image, the second user-controlled image viewpoint being different from the first user-controlled image viewpoint;

send the second update data parcel to the user mobile device over the one or more network communication channels, in response to the second request;

process the source image data to obtain a series of $K_{1-N}$ derivative images of progressively lower image resolution, the series of $K_{1-N}$ derivative images comprising the first derivative image and the second derivative image, wherein series image $K_0$ of the series of $K_{1-N}$ derivative images is subdivided into a regular array wherein each resulting image parcel of the array has a predetermined pixel resolution and a predetermined color or bit per pixel depth, resolution of the series $K_{1-N}$ of derivative images being related to resolution of the source image data or predecessor image in the series by a factor of two, and the array subdivision being related by a factor of two.

24. A computing system as in claim 23, wherein the first user-controlled image viewpoint is determined based at least in part on first navigational input of the user mobile device, and the first request is prepared by a processing control block of the user mobile device based at least in part on the first user-controlled image viewpoint.

25. A computing system as in claim 24, wherein the first request is prepared based at least in part on altitude and attitude of the first viewpoint relative to the predetermined image.

26. A computing system as in claim 24, wherein the second user-controlled image viewpoint is determined based at least in part on second navigational input of the user mobile device, and the second request is prepared by the processing control block of the user mobile device based at least in part on the second user-controlled image viewpoint.

27. A computing system as in claim 26, wherein the first request is prepared based at least in part on altitude and attitude of the first viewpoint relative to the predetermined image, and the second request is prepared based at least in part on altitude and attitude of the second viewpoint relative to the predetermined image.

28. A computing system as in claim 27, wherein the predetermined image is an image of a geographic area.

29. A computing system as in claim 27, wherein the first navigational input comprises first three-dimensional coordinate position data and first rotational position data, and the second navigational input comprises second three-dimensional position data and second rotational position data.

30. A computing system as in claim 26, wherein the first navigational input comprises first lateral x dimension position data, first lateral y dimension position data, and first rotational position data, and the second navigational input comprises second lateral x dimension position data, second lateral y dimension position data, and second rotational position data.

31. A computing system as in claim 24, wherein the fast update data parcel comprises first overlay data for the first derivative image.

32. A computing system as in claim 31, wherein the first overlay data comprises first text annotation relating to at least one item selected from the group consisting of: one or more street names, one or more building names, and one or more landmarks.

33. A computing system as in claim 31, wherein the first overlay data comprises graphic data representing a three-dimensional object.

34. A computing system as in claim 31, wherein the first overlay data comprises graphics data describing at least one object in more than two dimensions.

35. A computing system as in claim 31, wherein the first overlay data comprises one or more graphical icons.

36. A computing system as in claim 31, wherein the second update data parcel comprises second overlay data for the second derivative image.

37. A computing system as in claim 36, wherein the first overlay data and the second overlay data are in a resolution-independent format.

38. A computing system as in claim 31, wherein the first overlay data comprises first text annotation relating to at least one item selected from the group consisting of: one or more street names, one or more building names, and one or more landmarks.

39. A computing system as in claim 23, wherein the first derivative image includes the second derivative image, the second derivative image has a higher level of detail than the first derivative image, and the first request is received by the computing system before the second request by the computing system.

40. A computing system as in claim 23, wherein the second derivative image includes the first derivative image, the second derivative image has a lower level of detail than the first derivative image, and the first request is received by the computing system before the second request by the computing system.

41. A computing system as in claim 23, wherein the first derivative image does not include the second derivative image, and the second derivative image does not include the first derivative image.

42. A computing system as in claim 23 implemented on a plurality of servers.

43. A computing system as in claim 23, wherein each image parcel is of a fixed byte size.

44. An article of manufacture comprising a non-transitory machine-readable storage medium with program code stored in the medium, the program code, when executed by at least one processor of one or more servers configures the one or more servers to:

receive a first request from a user computing device, over one or more network communication channels, the first request being for a first update data parcel corresponding to a first derivative image of a predetermined image, the predetermined image corresponding to source image data, the first update data parcel uniquely forming a first discrete portion of the predetermined image, wherein the first update data parcel is selected based on a first user-controlled image viewpoint on the user computing device relative to the predetermined image;

send the first update data parcel to the user computing device over the one or more network communication channels, in response to the first request;

receive a second request from the user computing device, over the one or more network communication channels, the second request being for a second update data parcel corresponding to a second derivative image of the predetermined image, the second update data parcel uniquely forming a second discrete portion of the predetermined image, wherein the second update data parcel is selected based on a second user-controlled image viewpoint on the user computing device relative to the predetermined image, the second user-controlled image viewpoint being different from the first user-controlled image viewpoint;

send the second update data parcel to the user computing device over the one or more network communication channels, in response to the second request; and process the source image data to obtain a series of K1-N derivative images of progressively lower image resolution, the series of K1-N derivative images comprising the first derivative image and the second derivative image, wherein series image Ko of the series of $K_{1-N}$ derivative images is subdivided into a regular array wherein each resulting image parcel of the array has a predetermined pixel resolution and a predetermined color or bit per pixel depth, resolution of the series $K_1$-N of derivative images being related to resolution of the source image data or predecessor image in the series by a factor of two, and the array subdivision being related by a factor of two.

45. An article of manufacture as in claim 44, wherein the user computing device comprises a mobile device connected to the one or more servers by the one or more network communication channels.

46. An article of manufacture as in claim 45, wherein the first user-controlled image viewpoint is determined based at least in part on first navigational input of the user computing device, and the first request is prepared by a processing control block of the user computing device based at least in part on the first user-controlled image viewpoint.

47. An article of manufacture as in claim 46, wherein the first request is prepared based at least in part on altitude and attitude of the first viewpoint relative to the predetermined image.

48. An article of manufacture as in claim 46, wherein the second user-controlled image viewpoint is determined based at least in part on second navigational input of the user computing device, and the second request is prepared by the processing control block of the user computing device based at least in part on the second user-controlled image viewpoint.

49. An article of manufacture as in claim 48, wherein the first request is prepared based at least in part on altitude and attitude of the first viewpoint relative to the predetermined image, and the second request is prepared based at least in part on altitude and attitude of the second viewpoint relative to the predetermined image.

50. An article of manufacture as in claim 49, wherein the predetermined image is an image of a geographic area.

51. An article of manufacture as in claim 49, wherein the first navigational input comprises first three-dimensional coordinate position data and first rotational position data, and the second navigational input comprises second three-dimensional position data and second rotational position data.

52. An article of manufacture as in claim 48, wherein the first navigational input comprises first lateral x dimension position data first lateral y dimension position data, and first rotational position data, and the second navigational input comprises second lateral x dimension position data, second lateral y dimension position data, and second rotational position data.

53. An article of manufacture as in claim 46, wherein the first update data parcel comprises first overlay data for the first derivative image.

54. An article of manufacture as in claim 53, wherein the first overlay data comprises first text annotation relating to at least one item select from the group consisting of: one or more street names, one or more building names, and one or more landmarks.

55. An article of manufacture as in claim 53, wherein the first overlay data comprises graphic data representing a three-dimensional object.

56. An article of manufacture as in claim 53, wherein the first overlay data comprises graphics data describing at least one object in more than two dimensions.

57. An article of manufacture as in claim 53, wherein the first overlay data comprises one or more graphical icons.

58. An article of manufacture as in claim 53, wherein the second update data parcel comprises second overlay data for the second derivative image.

59. An article of manufacture as in claim 58, wherein the first overlay data and the second overlay data are in a resolution-independent format.

60. An article of manufacture as in claim 53, wherein the first overlay data comprises first text annotation relating to at least one item selected from the group consisting of: one or more street names, one or more building names, and one or more landmarks.

61. An article of manufacture as in claim 45, wherein the first derivative image includes the second derivative image, the second derivative image has a higher level of detail than the first derivative image, and the first request is received before the second request by the one or more servers.

62. An article of manufacture as in claim 45, wherein the second derivative image includes the first derivative image, the second derivative image has a lower level of detail than the first derivative image, and the first request is received before the second request by the one or more servers.

63. An article of manufacture as in claim 45, wherein the first derivative image does not include the second derivative image, and the second derivative image does not include the first derivative image.

64. An article of manufacture as in claim 45, wherein the one or more servers comprise at least two servers.

65. A method as in claim 45, wherein each image parcel is of a fixed byte size.

* * * * *

UNITED STATES PATENT AND TRADEMARK OFFICE
CERTIFICATE OF CORRECTION

PATENT NO. : 9,641,644 B2  
APPLICATION NO. : 14/970526  
DATED : May 2, 2017  
INVENTOR(S) : Isaac Levanon et al.

Page 1 of 1

It is certified that error appears in the above-identified patent and that said Letters Patent is hereby corrected as shown below:

In the Claims

Column 13, Line 8, cancel "selected, based" and replace the cancelled text with --selected based--;

Column 13, Line 43, cancel "in pan on" and replace the cancelled text with --in part on--;

Column 15, Line 65, cancel "fast" and replace the cancelled text with --first--;

Column 17, Line 12, cancel "K1-N" and replace the cancelled text with --$K_{1-N}$--;

Column 17, Line 14, cancel "K1-N" and replace the cancelled text with --$K_{1-N}$--;

Column 17, Line 21, cancel "$K_1$-N" and replace the cancelled text with --$K_{1-N}$--;

Column 18, Line 6, cancel "data first lateral" and replace the cancelled text with --data, first lateral--.

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*